(12) United States Patent
Haddleton

(10) Patent No.: US 6,310,149 B1
(45) Date of Patent: Oct. 30, 2001

(54) POLYMERIZATION CATALYST AND PROCESS

(75) Inventor: David Mark Haddleton, Kenilworth (GB)

(73) Assignee: University of Warwick, Coventry (GB)

( * ) Notice: Subject to any disclaimer, the term of this patent is extended or adjusted under 35 U.S.C. 154(b) by 0 days.

(21) Appl. No.: 09/202,096

(22) PCT Filed: Jun. 12, 1997

(86) PCT No.: PCT/GB97/01589

§ 371 Date: Feb. 1, 1999

§ 102(e) Date: Feb. 1, 1999

(87) PCT Pub. No.: WO97/47661

PCT Pub. Date: Dec. 18, 1997

(30) Foreign Application Priority Data

Jun. 12, 1996 (GB) .................................................. 9612265
Apr. 7, 1997 (GB) .................................................. 9707024

(51) Int. Cl.⁷ ...................................................... C08F 4/44
(52) U.S. Cl. ........................... 526/89; 526/172; 502/104; 502/162; 556/32; 556/110; 556/138
(58) Field of Search ..................... 526/135, 172, 526/89; 502/104, 162; 556/32, 110, 138

(56) References Cited

U.S. PATENT DOCUMENTS

| 4,728,706 | 3/1988 | Farnham et al. . |
| 4,940,760 | 7/1990 | Boettcher et al. . |
| 5,763,548 | 6/1998 | Matyjaszewski et al. . |
| 5,807,937 | 9/1998 | Matyjaszewski et al. . |

FOREIGN PATENT DOCUMENTS

| WO 96/30421 | 10/1996 | (WO) . |
| WO 97/18247 | 5/1997 | (WO) . |
| WO 98/01480 | 1/1998 | (WO) . |
| WO 98/03521 | 1/1998 | (WO) . |

OTHER PUBLICATIONS

Haddleton et al., Identifying the Nature of the Active Species in the Polymerization of Methacrylates, Macromolecules Jul. 1997, 30 3992–3998.*

M. Svoboda et al., *Diazadien–Nickel–Alkyle*, Journal of Organometallic Chemistry, vol. 191 (1980), pp. 321–328.

G. Van Koten et al., *1, 4–Diaza–1, 3–butadiene (α–Diimine) Ligands: Their Coordination Modes and the Reactivity of Their Metal Complexes*, Advances in Organometallic Chemistry, vol. 21, (1982), pp. 151–239.

J. Wang et al., *Controlled/"Living" Radical Polymerization. Halogen Atom Transfer Radical Polymerization Promoted by a Cu(I)/Cu(II) Redox Process*, Macromolecules, vol. 28, (1995), pp. 7901–7910.

V. Percec et al., *"Living" Radical Polymerization of Styrene Initiated by Arenesulfonyl Chlorides and Cu$^I$(bpy)$_n$Cl*, Macromolecules, vol. 28, (1995), pp. 7970–7972.

M. Kato et al., *Polymerization of Methyl Methacrylate with the Carbon Tetrachloride/Dichlorotris–(triphenylphosphine)ruthenium(II)/Methylaluminum Bis(2,6–di–tert–butylphenoxide) Initiating System: Possibility of Living Radical Polymerization*, Macromolecules, vol. 28, (1995), pp. 1721–1723.

C. Granel et al., *Controlled Radical Polymerization of Methacrylic Monomers in the Presence of a Bis(ortho–chelated) Arylnickel(II) Complex and Different Activated Alkyl Halides*, Macromolecules, vol. 29, (1996), pp. 8576–8582.

D. Haddleton et al., *Identifying the Nature of the Active Species in the Polymerization of Methacrylates: Inhibition of Methyl Methacrylate Homopolymerizations and Reactivity Ratios for Copolymerization of Methyl Methacrylate/ n–Butyl Methacrylate in Classical Anionic, Alkyllithium/ Trialkylaluminum–Initiated, Group Transfer Polymerization, Catalytic Chain Transfer, and Classical Free Radical Polymerization*, Macromolecules, vol. 30, (1997), pp. 3992–3998.

K. Matyjaszewski et al., *Controlled/"Living" Radical Polymerization. Kinetics of the Homogeneous Atom Transfer Radical Polymerization of Styrene*, J. Am. Chem. Soc., vol. 119, (1997), pp. 674–680.

Wang, Yun–Pu et al., "Synthesis and Selective Catalytic Oxidation Properties of Polymer–Bound Melamine Copper(II) Complex", Reactive & Functional Polymers, 1997, vol. 33, pp. 81–85.

(List continued on next page.)

Primary Examiner—David W. Wu
Assistant Examiner—R. Harlan
(74) Attorney, Agent, or Firm—Oliff & Berridge, PLC

(57) ABSTRACT

A catalyst is provided for addition polymerization of olefinically unsaturated monomers comprising a first compound MY, wherein M is a transition metal in a low valency state or a transition metal in a low valency state coordinated to at least one coordinating non-charged ligand, Y is a monovalent, divalent or polyvalent counterion; an initiator compound comprising a homolytically breakable bond with a halogen atom; and an organodiimine, where at least one of the nitrogens of the diimine is not part of an aromatic ring. A catalyst for addition polymerization of olefinically unsaturated monomers is also provided comprising a first component of Formula $$[ML]^{n+} A^{n-},$$

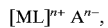

wherein M=a transition metal of low valency state, L=an organodiimine where at least one of the nitrogens of the diimine is not part of an aromatic ring, A=an anion, n=an integer of 1 to 3, m=an integer of 1 or 2;
e) An initiator compound comprising a homolytically breakable bond with a halogen atom.

Preferably, the organodiimine is a 1,4-diaza-1,3-butadiene, a pyridine carbaldelyde imine, an oxazolidone or a quinoline carbaldehyde.

Processes for using the catalysts are also disclosed.

18 Claims, 9 Drawing Sheets

OTHER PUBLICATIONS

Svoboda, Michael et al., "Diazadien–Nickel–Alkyle", *Journal of Organometallic Chemistry*, 1980, vol., 191, pp. 321–328.

Koten, Gerard Van et al., "1,4–Diaza– 1,3–butadiene (a–Diimine) Ligands: Their Coordination Modes and the Reactivity of Their Metal Complexes", *Advance in Organometallic Chemistry*, 1982, vol. 21, pp. 151–239.

Sawamoto, Mitsuo et al., "Design and Mechanism of Living Cationic and Radical Polymerizations", *International Symposium on Ionic Polymerization*, Istanbul Technical Universiry, Sep. 4–8, 1995, p. 11.

Mitsuru, Kato et al., "Polymerization of Methyl Methacrylate with the Carbon Tetrachloride/Dichlorotris– (triphenylphosphine) ruthenium (II)/Methylaluminum Bis (2,6–di–tert–butylphenoxide) Initiating System: Possibility of Living Radical Polymerization", *Macromolecules*, 1995, vol. 28, pp. 1721–1723.

Wang, Jin–Shan, et al., "Controlled/"Living" Radical Polymerization. Halogen Atom Transfer Radical Polymerization Promoted by a Cu(I)/Cu(II) Redox Process", *Macromolecules*, 1995, vol. 28 pp. 7901–7910.

Percec, Virgil et al., "Living" Radical Polymerization of Styrene Initiated by Arenesulfonyl Chlorides and $Cu^1(bpy)_nCl$, *Macromolecules*, 1995, vol. 28, pp. 7970–7972.

Percec, Virgil et al., "Metal Catalyzed "Living" Radical Polymerization of Styrene Initiated with Arenesulfonyl Chlorides. From Heterogeneous to Homogeneous Catalysis", *Macromolecules*, 1996, vol. 29, pp. 3665–3668.

Nishikawa, Tomotaka, et al., "Evidence for Living Radical Polymerization of Methyl Methacrylate with Ruthenium Complex: Effects of Protic and Radical Compounds and Reinitiation from the Recovered Polymers", *Macromolecules*, 1997, vol. 30, pp. 2244–2248.

Haddleton, David M., "Identifying the Nature of the Active Species in the Polymerization of Methacrylates: Inhibition of Methyl Methacrylate Homopolymerizations and Reactivity Ratios for Copolymerization of Methyl Methacrylate/ n–Butyl Methacrylate in Classical Anionic, Alkyllithium/ Trialkylaluminum–Initiated, Group Transfer Polymerization, Atom Transfer Radical Polymeriation, Catalytic Chain Transfer, and Classical Free Radical Polymerization", *Macromolecules*, 1997, vol. 30, pp. 3992–3998.

* cited by examiner

POLYMERIZATION CATALYST AND PROCESS

BACKGROUND OF THE INVENTION

1. Field of Invention

The present invention relates to a process for the atom transfer polymerization of olefinically unsaturated monomers in which molecular weight control is achieved by the presence of certain transition metals, especially copper, and diimine complexes.

2. Description of Related Art

It is desirable to be able to produce high molecular weight polymers with a low molecular weight distribution by catalyzed addition polymerization, in particular of vinylic monomers. Hitherto, this has been achieved by polymerizing via ionic processes typically in the presence of organometallics such as alkyl lithiums that are sensitive when reacted with water and other protic species. Therefore, monomers containing functional groups are not readily polymerized. The use of ionic systems also precludes the use of solvents that contain protic groups and/or impurities resulting in very stringent reaction conditions and reagent purity being employed.

More recently, radical polymerization systems based on the combination of a transition metal halide and an alkyl halide have been used. For example, Matyjasewski (Macromolecules (1995), vol. 28, pages 7901–7910 and WO96/30421) describes the use of CuX (where X=Cl, Br) in conjunction with bipyridine and an alkyl halide to give polymers of narrow molecular weight distribution and controlled molecular weight. This system suffers from the disadvantage that the copper catalyst is only partially soluble in the system and thus a heterogeneous polymerization ensues. The level of catalyst that is active in solution is thus difficult to determine. Percec (Macromolecules, (1995), vol. 28, page 1995) has extended Matyjasewski's work by using arenesulphonyl chlorides to replace alkyl chlorides, again this results in heterogeneous polymerization. Sawamoto (Macromolecules, (1995), vol. 28, page 1721 and Macromolecules, (1997), vol. 30, page 2244) has also used a ruthenium based system for similar polymerization of methacrylates. This system requires activation of monomer by aluminum alkyl, itself sensitive to reaction with protic species which is an inherent disadvantage. These systems have been described as proceeding via a free radical mechanism that suffers from the problem that the rate of termination is >0 due to normal radical-radical combination and disproportionation.

SUMMARY OF THE INVENTION

Surprisingly, the inventors of the present invention have found that the use of diimines such as 1,4-diaza-1,3-butadienes and 2-pyridinecarbaldehyde imines may be used in place of bipyridines. These ligands offer the advantage of homogeneous polymerization and thus the level of active catalyst can be accurately controlled. This class of ligand also enables the control of the relative stability of the transition metal valencies, for example, Cu(I) and Cu(II), by altering ancillary substituents and thus gives control over the nature of the products through control over the appropriate chemical equilibrium. Such a system is tolerant to trace impurities, trace levels of $O_2$ and functional monomers, and may even be conducted in aqueous media.

A further advantage of the system of the present invention is that the presence of free-radical inhibitors traditionally used to inhibit polymerization of commercial monomers in storage, such as 2, 6-di-tert-butyl-4-methylphenol (topanol), increases the rate of reaction of the present invention. This means that lengthy purification of commercial monomers to remove such radical inhibitors is not required. Furthermore, this indicates that the system of the invention is not a free-radical process. This is contrary to the Matajaszewski and Sawamoto who show free-radical based systems.

Accordingly a first aspect of the invention provides a catalyst for addition polymerization of olefinically unsaturated monomers, especially vinylic monomers, comprising:
a) a first compound of formula 1

MY where M is a transition metal in a low valency state or a transition metal in a low valency state coordinated to at least one coordinating non-charged ligand and Y is a monovalent or polyvalent counterion;
b) an initiator compound comprising a homolytically cleavable bond with a halogen atom.

A "homolytically cleavable bond" means a bond that breaks without integral charge formation on either atom by homolytic fission Conventionally, this produces a radical on the compound and a halogen atom radical. For example:

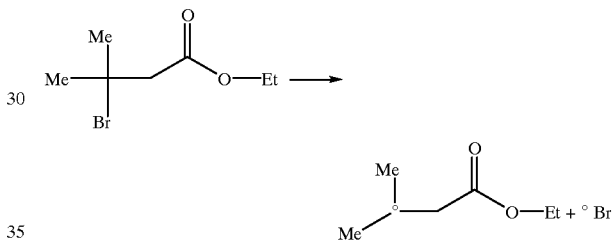

However, the increase in the rate of reaction observed by the inventors with free-radical inhibitors indicates that true free-radicals do not appear to be formed using the catalysts of the present invention. It is believed that this occurs in a concerted fashion whereby the monomer is inserted into the bond without formation of a discrete free radical species in the system. That is, during propagation this results in the formation of a new carbon-carbon bond and a new carbon-halogen bond without free-radical formation. The mechanism involves bridging halogen atoms such as:

where:
ML is a transition metal-diimine complex as defined below. A "free-radical" is defined as an atom or group of atoms having an unpaired valence electron and which is a separate entity without other interactions.
c) an organodiimine, where one of the nitrogens of the diimine is not part of an aromatic ring.

Transitional metals may have different valencies, for example Fe(II) and Fe(III), Cu(I) and Cu(II), a low valency state is the lower of the commonly occurring valencies, i.e. Fe(II) or Cu(I). Hence M in Formula I is preferably Cu(I), Fe(II), Co(II), Ru(II) or Ni(II), most preferably Cu(I). Preferably, the coordinating ligand is $(CH_3CN)_4$. Y may be chosen from Cl, Br, F, I, $NO_3$, $PF_6$, $BF_4$, $SO_4$, CN, SPh, SCN, SePh or triflate ($CF_3SO_3$). Copper (I) triflate may be in the form of a commercially available benzene complex $(CF_3SO_3Cu)_2C_6H_6$. The most preferred compound is CuBr. Preferably, the second component (b) is selected from Formula 2

RX

Formula 3

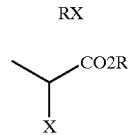

Formula 4

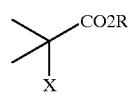

Formula 5

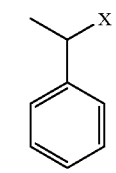

Formula 6

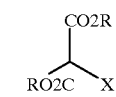

Formula 7

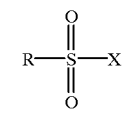

Formula 8

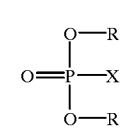

Formula 9

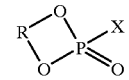

Formula 10

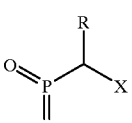

Formula 11

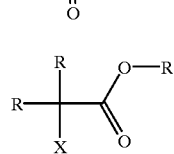

Formula 12

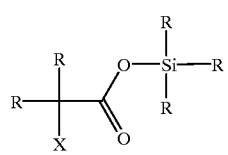

where R is independently selectable and is selected from straight, branched or cyclic alkyl, hydrogen, substituted alkyl, hydroxyalkyl, carboxyalkyl or substituted benzyl. Preferably the or each alkyl, hydroxyalkyl or carboxyalkyl contains 1 to 20, especially 1 to 5 carbon atoms.

X is a halide, especially I, Br, F or Cl.

The second component (b) may especially be selected from Formulae 13 to 23:

Formula 13

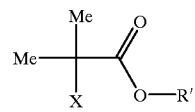

where:

X=Br, I or Cl, preferably Br

R'=—H,

—$(CH_2)_pR''$ (where m is a whole number, preferably p=1 to 20, more preferably 1 to 10, most preferably 1 to 5, R"=H, OH, COOH, halide, $NH_2$, $SO_3$, COX—where x is Br, I or C) or:

Formula 14

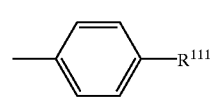

$R^{111}$=—COOH, —COX (where X is Br, I, F or Cl), —OH, —$NH_2$ or —$SO_3H$, especially 2-hydroxyethyl-2'-methyl-2'bromopropionate.

Formula 15

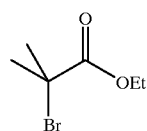

Formula 16

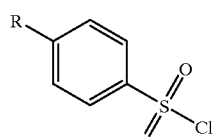

R = Me, MeO, halogen

Especially preferred examples of Formula 16 are:

Formula 16A

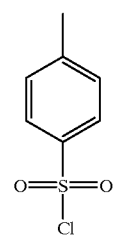

-continued

Formula 16B
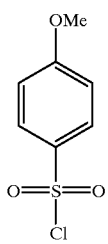

Br may be used instead at Cl in Formulae 16A and 16B.

Formula 17

Formula 18
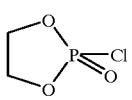

Formula 19
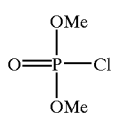

Formula 20
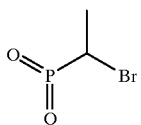

Formula 21
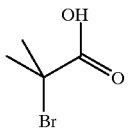

Formula 22
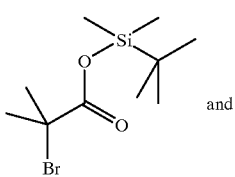
and

Formula 23
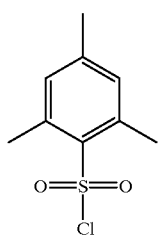

The careful selection of functional alkyl halides allows the production of terminally functionalized polymers. For example, the selection of a hydroxy containing alkyl bromide allows the production of α-hydroxy terminal polymers. This can be achieved without the need of protecting group chemistry.

Component (c) may be a 1,4-diaza-1,3-butadiene

Formula 24
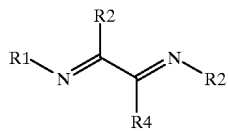

a 2-pyridinecarbaldehyde imine

Formula 25
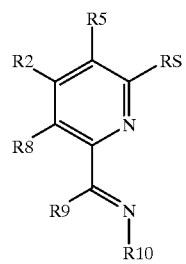

An Oxazolidone

Formula 26
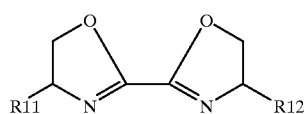

or a Quinoline Carbaldehyde

Formula 27
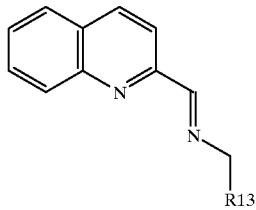

where $R_1$, $R_2$, $R_{10}$, $R_{11}$, $R_{12}$ and $R_{13}$ may be varied independently and $R_1$, $R_2$, $R_{10}$, $R_{11}$, $R_{12}$ and $R_{13}$ may be H, straight chain, branched chain or cyclic saturated alkyl, hydroxyalkyl, carboxyalkyl, aryl (such as phenyl or phenyl substituted where substitution is as described for $R_4$ to $R_9$), $CH_2Ar$ (where Ar=aryl or substituted aryl) or a halogen. Preferably $R_1$, $R_2$, $R_{10}$, $R_{11}$, $R_{12}$ and $R_{13}$ may be a $C_1$ to $C_{20}$ alkyl, hydroxyalkyl or carboxyalkyl, in particular $C_1$ to $C_4$ alkyl, especially methyl or ethyl, n-propylisopropyl, n-butyl, sec-butyl, tert butyl, cyclohexyl, 2-ethylhexyl, octyl decyl or lauryl. $R_1$, $R_2$, $R_{10}$, $R_{11}$, $R_{12}$ and $R_{13}$ may especially be methyl.

$R_3$ to $R_9$ may independently be selected from the group described for $R_1$, $R_2$, $R_{10}$, $R_{11}$, $R_{12}$ and $R_{13}$ or additionally $OCH_{2n+1}$ (where n is an integer from 1 to 20), $NO_2$, CN or O=CR (where R=alkyl, benzyl $PhCH_2$ or a substituted benzyl, preferably a $C_1$ to $C_{20}$ alkyl, especially a $C_1$ to $C_4$ alkyl).

Furthermore, the compounds may exhibit a chiral centre α to one of the nitrogen groups. This allows the possibility for polymers having different stereochemistry structures to be produced.

Compounds of general Formula 25 may comprise one or more fused rings on the pyridine group.

One or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups may be $C_5$ to $C_8$ cycloalkyl, cycloalkenyl, polycycloalkyl, polycycloalkenyl or cyclicaryl, such as cyclohexyl, cyclohexenyl or norborneyl.

Preferred ligands include:

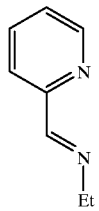

Formula 28

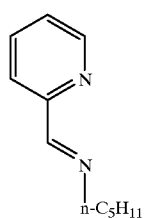

Formula 29

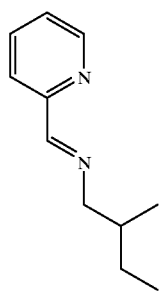

Formula 30

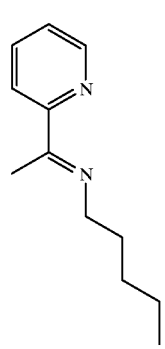

Formula 31

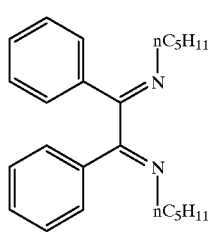

Formula 32

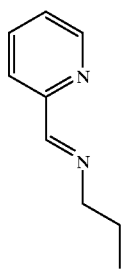

Formula 33

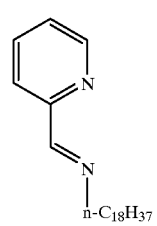

Formula 34

Formula 35

Formula 36

Formula 37

Formula 38

-continued
Formula 39
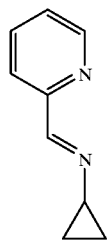
Formula 40
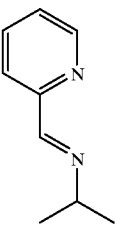
Formula 41
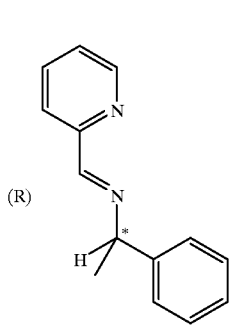
(R)
Formula 42
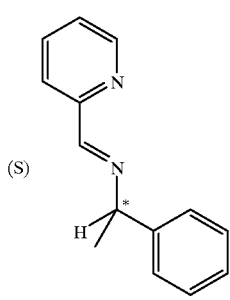
(S)
Formula 43
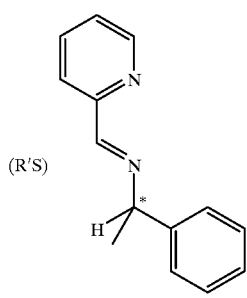
(R′S)
Formula 44
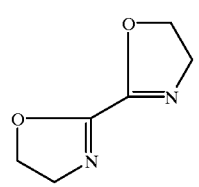
-continued
Formula 45
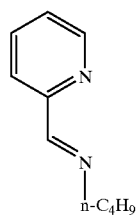
n-C₄H₉
Formula 46
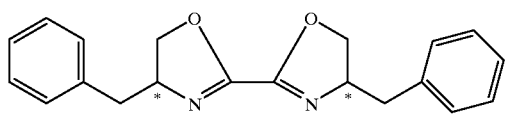
Formula 47
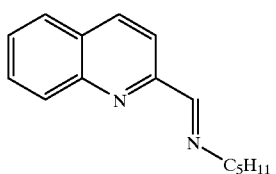
Formula 48
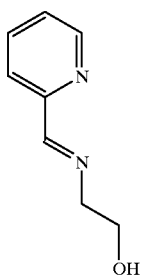
Formula 49
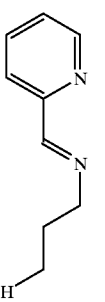
Formula 50
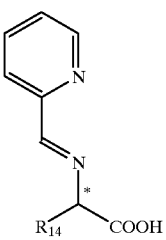
and

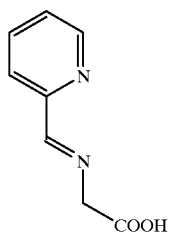

Formula 51 where: * indicates a chiral centre

R14 =Hydrogen, $C_1$ to $C_{10}$ branched chain alkyl, carboxy- or hydroxy- $C_1$ to $C_{10}$ alkyl.

A second aspect of the invention provides a catalyst for addition polymerization of olefinically unsaturated monomers, especially vinylic monomers, comprising:
a first component of Formula 51

$[ML_m]^{n+}A^-$ wherein M=a transitional metal in a low valency state;
L=an organodiimine, where at least one of the nitrogens of the diimine is not part of an aromatic ring,
A=an anion
n=a whole integer of 1 to 3
m=an integer of 1 to 2.
(e) An initiator comprising a homolytically cleavable bond with a halogen atom, as previously defined.

Preferably, M is as previously defined for component (a). L may be a compound according to Formula 24, 25, 26 or 27, as previously defined. A may be F, Cl, Br, I, $NO_3$, $SO_4$ or $CuX_2$ (where X is a halogen).

The preferred initiators (e) are as defined for the first aspect of the invention. The invention also provides the use of the catalyst according to the first or second aspect of the invention in the addition polymerization of one or more olefinically unsaturated monomers and the polymerized products of such processes.

The components (a), (b) and (c), or (d) and (e) may be used together in any order.

The inventors have unexpectedly found that the catalyst will work at a wide variety of temperatures, including room temperature and as low as −15° C. Accordingly, preferably the catalyst is used at a temperature of −20° C. to 200° C., especially −20° C. to 150° C., 20° C. to 13° C., more preferably 90° C.

The olefinically unsaturated monomer may be a methacrylic, an acrylate, a styrene, methacrylonitrile or a diene such as butadiene.

Examples of olefinically unsaturated monomers that may be polymerized include methyl methacrylate, ethyl methacrylate, propyl methacrylate (all isomers), butyl methacrylate (all isomers), and other alkyl methacrylates; corresponding acrylates; also functionalized methacrylates and acrylates including glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2=C(Hal)_2$ where each halogen is independently Cl or F; optionally substituted butadienes of the formula $CH_2=C(R_{15}) C(R_{15})=CH_2$ where $R_{15}$ is independently H, C1 to C10 alkyl, Cl, or F; sulphonic acids or derivatives thereof of formula $CH_2=CHSO_2OM$ wherein M is Na, K, Li, $N(R_{16})_4$ where each $R_{16}$ is independently H or Cl or V10 alkyl, D is COZ, ON, $N(R_{16})2$ or $SO_2OZ$ and Z is H, Li, Na, K or $N(R_{16})_4$; acrylamide or derivatives thereof of formula $CH_2=CHCON(R_{16})_2$ and methacrylamide or derivative thereof of formula $CH_2=C(CH_3)CON(R_{16})_2$. Mixtures of such monomers may be used.

Preferably, the monomers are commercially available and may comprise a free-radical inhibitor such as 2, 6-di-tert-butyl-4-methylphenol or methoxyplenol.

Preferably, the co-catalysts are used in the ratios (c):(a) 0.01 to 1000, preferably 0.1 to 10, and (a):(b) 0.0001 to 1000, preferably 0.1 to 10, where the degree of polymerization is controlled by the ratio of monomer to (b).

Preferably, the components of the catalyst of the second aspect of the invention are added at a ratio M:initiator of 3:1 to 1:100.

Preferably, the amount of diimine:metal used in the systems is between 100:1 and 1:1, preferably 5:1 to 1:1, more preferably 3:1 to 1:1.

The reaction may take place with or without the presence of a solvent. Suitable solvents in which the catalyst, monomer and polymer product are sufficiently soluble for reactions to occur include water, protic and non-protic solvents including propionitrile, hexane, heptane, dimethoxyethane, diethoxyethane, tetrahydrofuran, ethylacetate, diethylether, N,N-dimethylformamide, anisole, acetonitrile, diphenylether, methylisobutyrate, butan-2-one, toluene and xylene. Especially preferred solvents are xylene and toluene, preferably the solvents are used at at least 1% by weight, more preferably at at least 10% by weight.

Preferably, the concentration of monomer in the solvents is 100% to 1%, preferably 100% to 5%.

The reaction may be undertaken under an inert atmosphere such as nitrogen or argon.

The reaction may be carried out in suspension, emulsion, mini-emulsion or in a dispersion.

Statistical copolymers may be produced using the catalysts according to the present invention. Such copolymers may use 2 or more monomers in a range of about 0–100% by weight of each of the monomers used.

Block copolymers may also be prepared by sequential addition of monomers to the reaction catalyst.

Telechelic polymers, may be produced using catalysts of the invention. For example, a functional initiator such as Formula 21 may be used with transformation of the ωBr group to a functional group such as —OH or —$CO_2H$ via use of a suitable reactant such as sodium azide.

Comb and graft copolymers may be produced using the catalysts of the invention to allow, for example, polymers having functional side chains to be produced, by use of suitable reagents.

BRIEF DESCRIPTION OF THE DRAWINGS

Embodiments of the invention will now be described by way of example and with reference to the following figures.

DETAILED DESCRIPTION OF PREFERRED EMBODIMENTS

EXAMPLES

Synthesis of Ligands
Diazabutadiene (DAB) Ligands

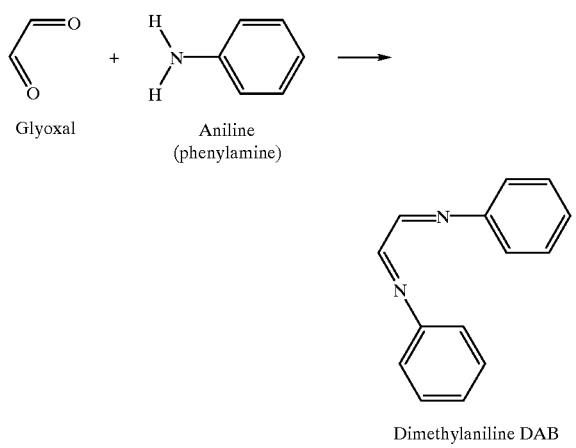

Dimethylaniline DAB

To a stirred solution of 40% aqueous glyoxal (0.25 mol) in a conical flask was added the required amine dropwise (0.5 mol). After a period of time a pale yellow solution formed which was taken up with water and filtered. The resulting precipitate was dissolved in diethyl ether and poured over a large excess of magnesium sulfate. The solution was left for twelve hours to remove all the water and the solution was filtered. Ether was removed on a rotary evaporator then the product recrystallized from ether. Tert-Butyl DAB (tBu DAB) and isoPropyl DAB (iPr DAB) were similarly manufactured using t-butylamine and isopropylamine respectively as the starting amine. Such compounds are superior to 2,2-bipyridine in accepting electron density Pyridine Carbaldehyde Ligands

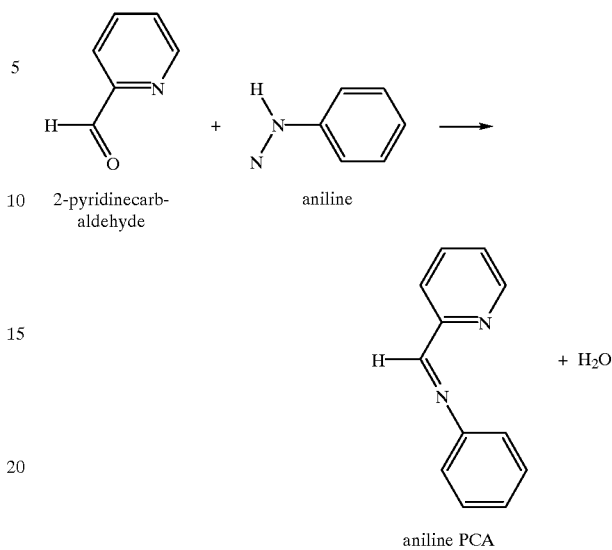

aniline PCA

To a stirred solution of pyridine carbaldehyde in ether was added an equimolar quantity of amine. The solution was left for 3 hours then poured over an excess of magnesium sulfate. The solution was filtered and the ether removed on a rotary evaporator. Some ligands formed yellow oils and were purified by distillation under reduced pressure. Solids were purified by recrystallization from ether.

tBu PCA, iPr PCA, nButyl PCA (nBu PCA), Dimethylaniline PCA, Diisopropylaniline PCA and methoxyaniline PCA were also made by reacting $^t$BuNH$_2$, $^i$PrNH$_2$, $^n$BuNH$_2$, 2,6-dimethylaniline, 2,6-diisoproxylaniline and 4-methoxyaniline, respectively as the amine.

Characterization of Ligands

Ligands have been initially characterized by NMR and EI/CI mass spectrometry. Mass spec data is tabulated below.

DIAZABUTIENE (DAB) LIGANDS

| Structure | RMM | M/Z |
|---|---|---|
| tBu DAB | 168 | 166 |
| iPr DAB | 140 | 141 |
| Dimethylaniline DAB | 262 | 249 |

PYRIDINE CARBALDEHYDE (PCA) LIGANDS

| Structure | RMM | M/Z |
|---|---|---|
| tBu PCA | 162 | 163 |
| iPr PCA | 149 | 149 |
| nBu PCA | 162 | 163 |
| Aniline PCA | 182 | 182 |
| Dimethylaniline PCA | 212 | 209 |
| Diisopropylaniline PCA | 268 | 223 |
| Methoxyaniline PCA | 197 | 211 |

Figure 1:
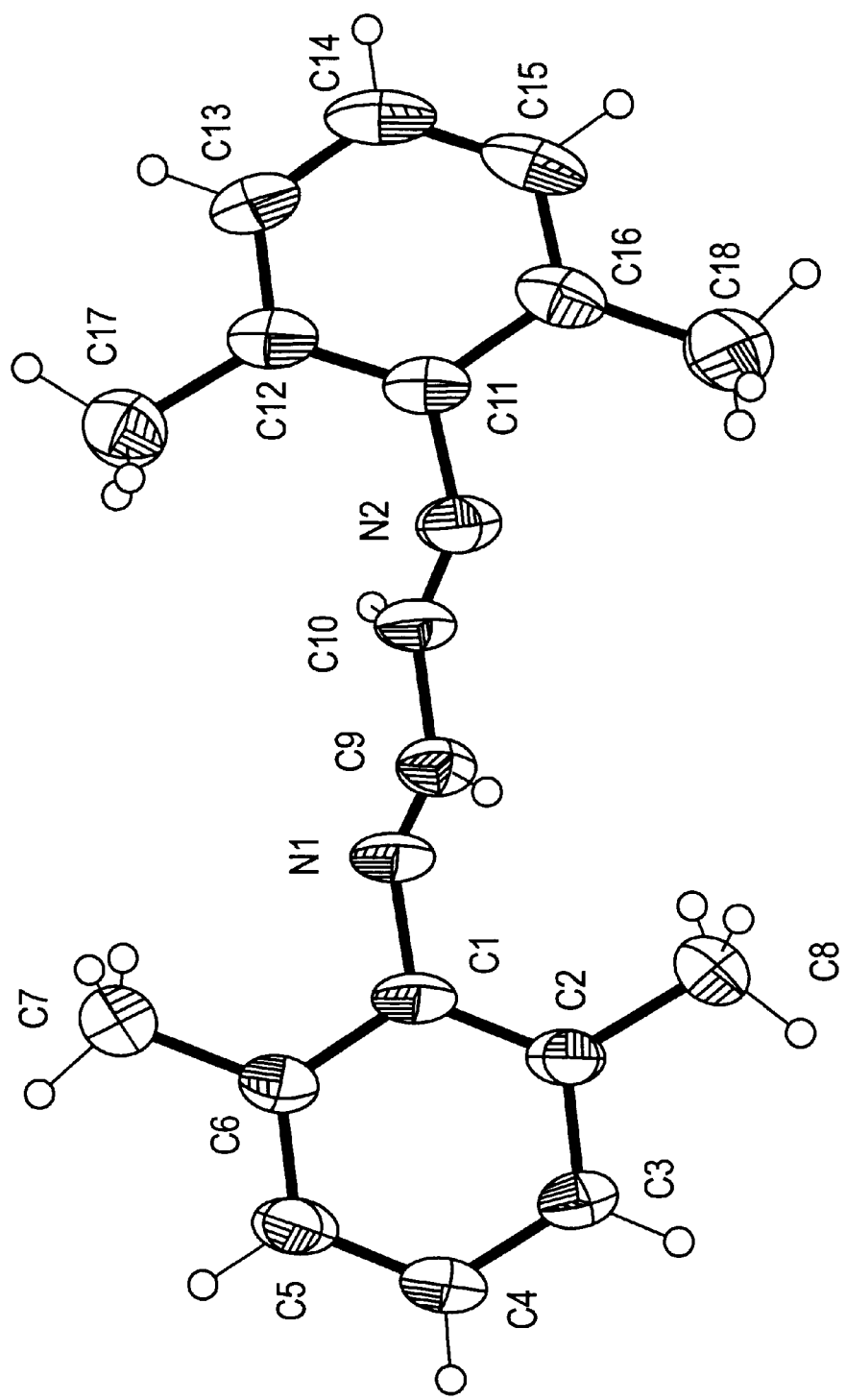
FIG. 1 shows the structure of the ligand 2,6 dimethylanilineDAB.

A crystal structure has been obtained of the ligand 2, 6 dimethylaniline DAB (FIG. 1). This shows a E configuration of double bonds which must fold around the metal centre to form the catalyst.

Synthesis of Catalysts

To a solution of ligand (in acetone) in a schlenk ways added copper bromide, chloride or $Cu(CH_3CN)_4BF_4$ under nitrogen. The solution was filtered by cannular and placed in a freezer. Solvent was removed by filtration and the crystals examined by FAB mass spectrometry. Catalysts were synthesised with equimolar quantities of ligand and anion or excess ligand (2:1). Both experiments resulted in the detection of a peak corresponding to CuL2.
L=ligand.

| Ligand | Ligand:anion | Anion | Mass spectometry data M/Z | | | |
|---|---|---|---|---|---|---|
| | | | CuL | $CuL_2$ | $Cu_2L_2Cl$ | $Cu_2L_2Cl_2$ |
| tBuDAB | 1:1 | Br | 231 | 399 | | |
| tBuDAB | 1:1 | $BF_4$ | 231 | 399 | | |
| tBuDAB | 2:1 | Br | 231 | 399 | | |
| tBuDAB | 1:1 | Cl | — | 399 | 499 | 597 |
| iPrDAB | 1:1 | Br | 203 | 343 | | |
| tBuPCA | 1:1 | Br | 225 | 387 | | |
| tBuPCA | 1:1 | $BF_4$ | 225 | 387 | | |
| tBuPCA | 1:1 | Cl | — | 387 | | |
| Bipy | 1:1 | Br | 300 | 456 | | |
| Bipy | 1:1 | $BF_4$ | 219 | 375 | | |
| Bipy | 2:1 | $BF_4$ | 219 | 375 | | |
| Bipy | 1:1 | Cl | — | 375 | | |

Bipy (Bipyridyl) is included as a comparison.

Figure 2:
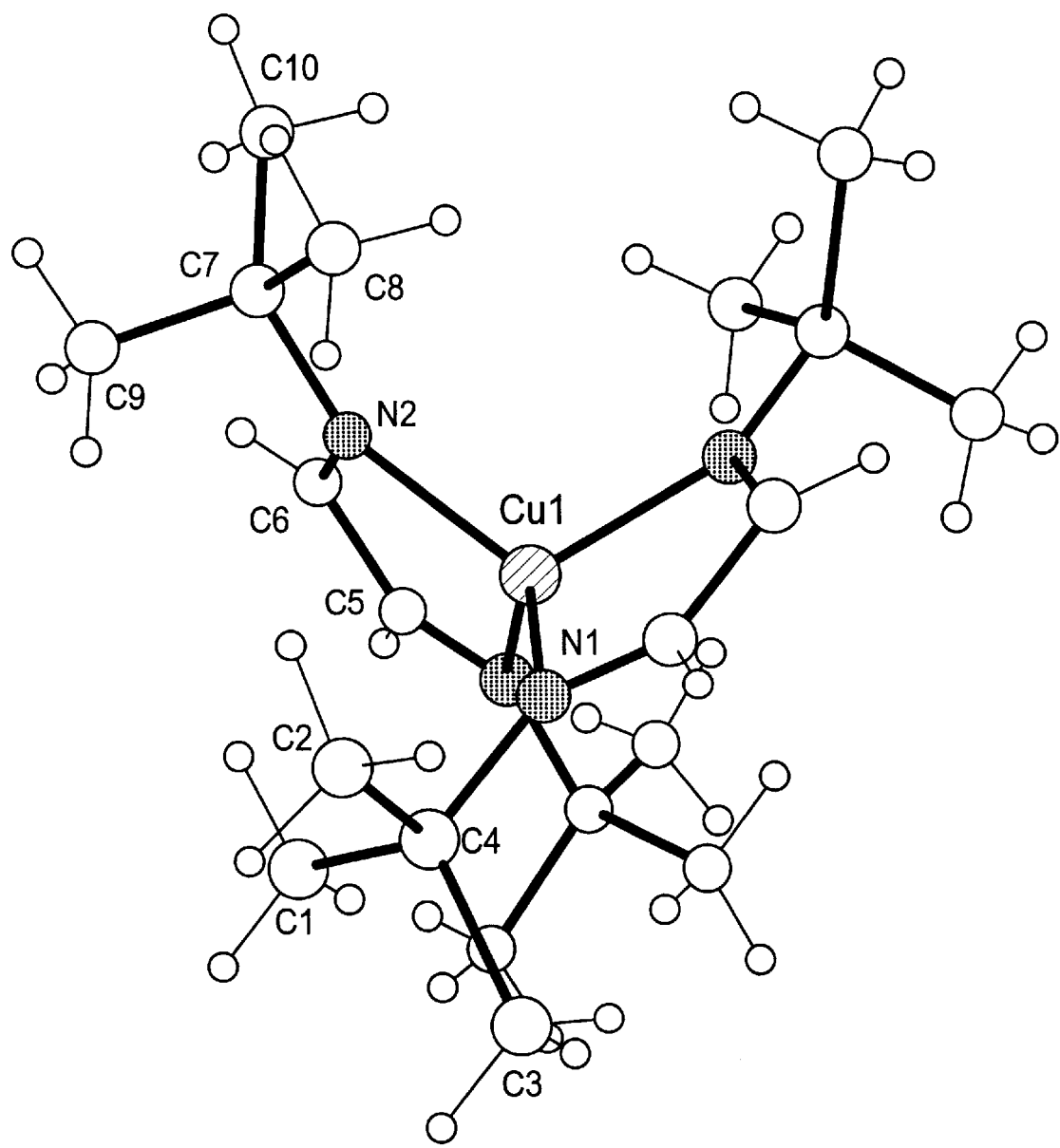
FIG. 2 shows the crystal structure of the cation obtained by reacting tBuDAB and CuBr together.

A crystal structure has been obtained for the reaction of tBu DAB and CuBr indicating a tetrahedral intermediate (FIG. 2).

Polymer Synthesis

The catalysts were used to control the propagation of styrene and methylmethacrylate.

All polymerizations were performed with excess ligand [L]:[Cu] 3:1 and the catalyst is synthesized in situ.

General Method for Polymerization of Methylmethacrylate

To a Schlenk flask to be purged with nitrogen was added 0.54 mls ethyl 2-bromo-isobutyrate (0.00372 mols) in 10 mls methylmethacrylate (0.0935 mols). The desired ligand was then added (0.01122 mols) and the entire solution was freeze pump thaw degassed. 0.536 g copper bromide (0.00374 mols) was then added whilst stirring. When the solution turned deep red indicating formulation of the catalyst the Schlenk flask was immersed in an oil bath at 90° C.

Polymerization Results

All polymerisations are based on the following mole ratios.

Monomer:Initiator:Copper X • Ligand
100 • 1 : 1 : 3

Copper X=catalyst based on copper.

Styrene (Sty) was initiated with 1-phenylethyl bromide or chlorine.

Methylmethacrylate (MMA) was initiated with ethyl-2-bromo isobutyrate.

| ligand | mon. | X | t/hrs | T/*C | Mn | Mw | PDi | Conv % |
|---|---|---|---|---|---|---|---|---|
| tbuDAB | STY | Br | 24 | 110 | 2,173 | 4,438 | 2 | 11 |
| iPrDAB | STY | Br | 24 | 110 | 1,975 | 72,587 | 38 | 5 |
| dimethylaniline DAB | STY | Br | 24 | 110 | 467 | 4,156 | 9 | 80 |
| tBuPCA | STY | Br | 24 | 110 | 338 | 1,110 | 3.2 | 1 |
| aniline PCA | STY | Br | 24 | 110 | 6,458 | 22,376 | 3.5 | 41 |
| dimethylaniline | STY | Br | 24 | 110 | 3,017 | 9,167 | 3 | 68 |
| tBuPCA | STY | Cl | 20 | 130 | 42,551 | 102,776 | 2.45 | 20 |
| nBuPCA | STY | Cl | 3 | 130 | 6,951 | 22,571 | 3.25 | 40 |
| iPrPCA | STY | Cl | 20 | 130 | 15,607 | 41,125 | 2.64 | 33 |
| aniline PCA | STY | Br | 20 | 110 | 6,458 | 22,376 | 4 | 41 |
| dimethylaniline PCA | STY | Br | 20 | 110 | 3,017 | 9,167 | 3 | 68 |
| ipropylaniline PCA | STY | Br | 20 | 130 | 3,700 | 10,074 | 2.72 | 61 |
| methoxyaniline PCA | STY | Br | 20 | 130 | 9,723 | 24,772 | 2.5 | 69 |
| aniline PCA | MMA | Br | 18 | 110 | 477 | 4,600 | 9.6 | 2 |
| dimethylaniline PCA | MMA | Br | 18 | 110 | 6,293 | 12,210 | 1.94 | 68 |
| nBuPCA | MMA | Br | 4 | 100 | 10,251 | 12,273 | 1.2 | 95 |
| nBuPCA | MMA | Br | 1 | 130 | 7,376 | 12,422 | 1.68 | — |
| nBuPCA | STY | Br | 40 | 80 | 5,492 | 7,313 | 1.33 | 43 |
| nBuPCA | STY | Br | 20 | 80 | 6,343 | 9,533 | 1.5 | 39 |

Polymerization with tBuDAB t-BuDAB was also investigated in more detail using different ratios of Ligand (L), Initiator (I) and catalyst (Cu).

Styrene at 100° C.

| L:I | Cu:I | Mn | PDI | % Conv. |
|---|---|---|---|---|
| 3 | 1 | 2173 | 2.0 | 11 |
| 3 | 20 | 2603 | 4.0 | 7 |
| 3 | 100 | 2169 | 5.8 | 8 |
| 1 | 1 | 2400 | 3.6 | 9 |

| L:I | Cu:I | Mn | PDI | % Conv. |
|---|---|---|---|---|
| 1 | 100 | 8042 | 14 | 7 |
| 3 | 1 | 2020 | 4.1 | Low |

This shows that PDI may be controlled by varying the ratio of L:I and/or Cu:I.

Polymerizations with nBuPCA

A successful ligand was nBuPCA which will form the following copper (I) structure:

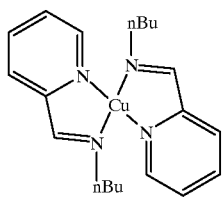

This catalyst has been used to obtain kinetic data for the polymerization of both styrene and methylmethacrylate. Temperature control is important to prevent termination leading to tailing of the resulting MW distribution. If termination is prevented then polydispersity will decrease with time. Mn conversion plots have been obtained at different monomer to initiator ratios.

Figure 3:
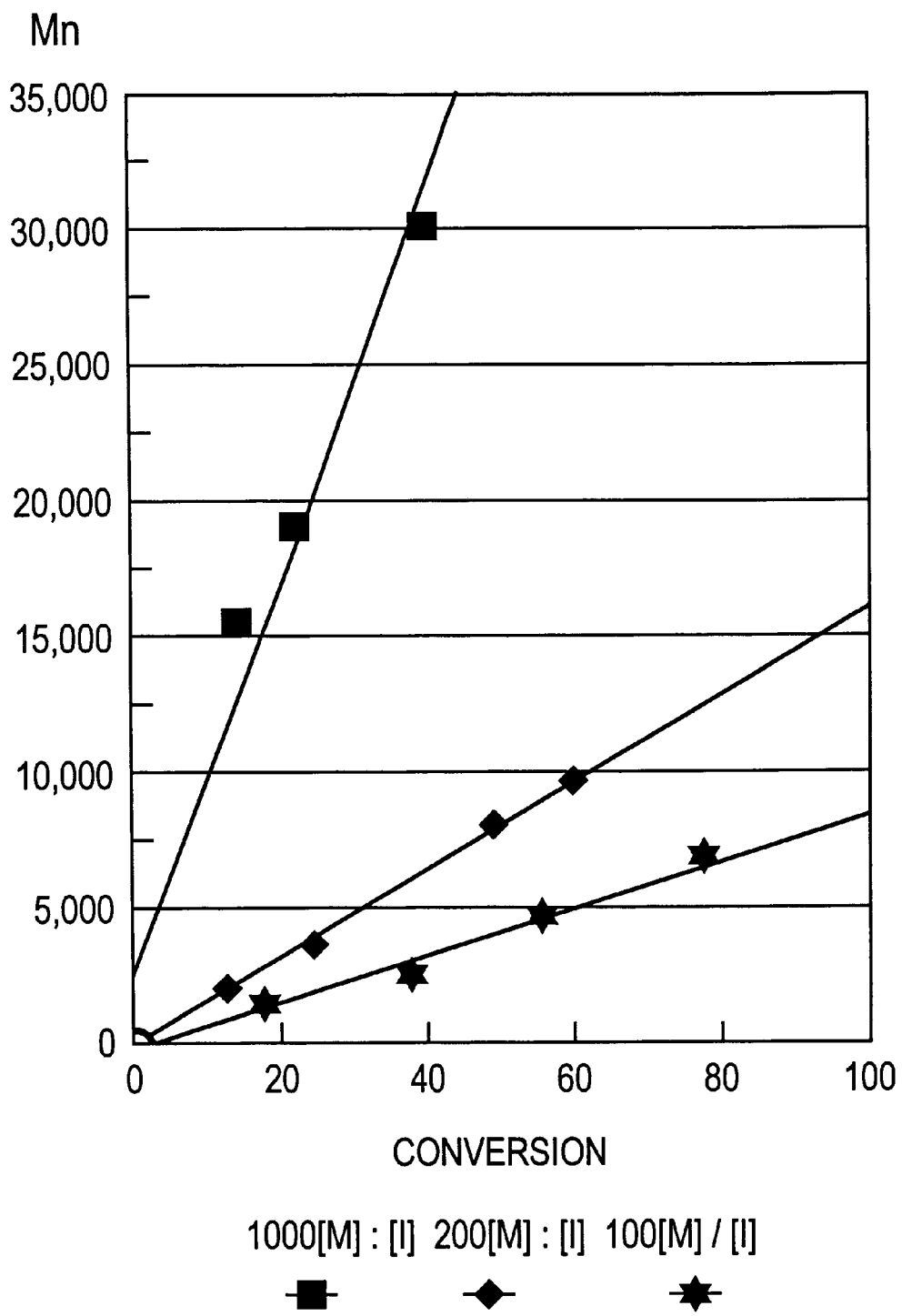
FIGS. 3 and 4 show Mn dependence on conversion of different monomer initiator ratios for styrene and methylmethacrylate respectively.
Figure 4:
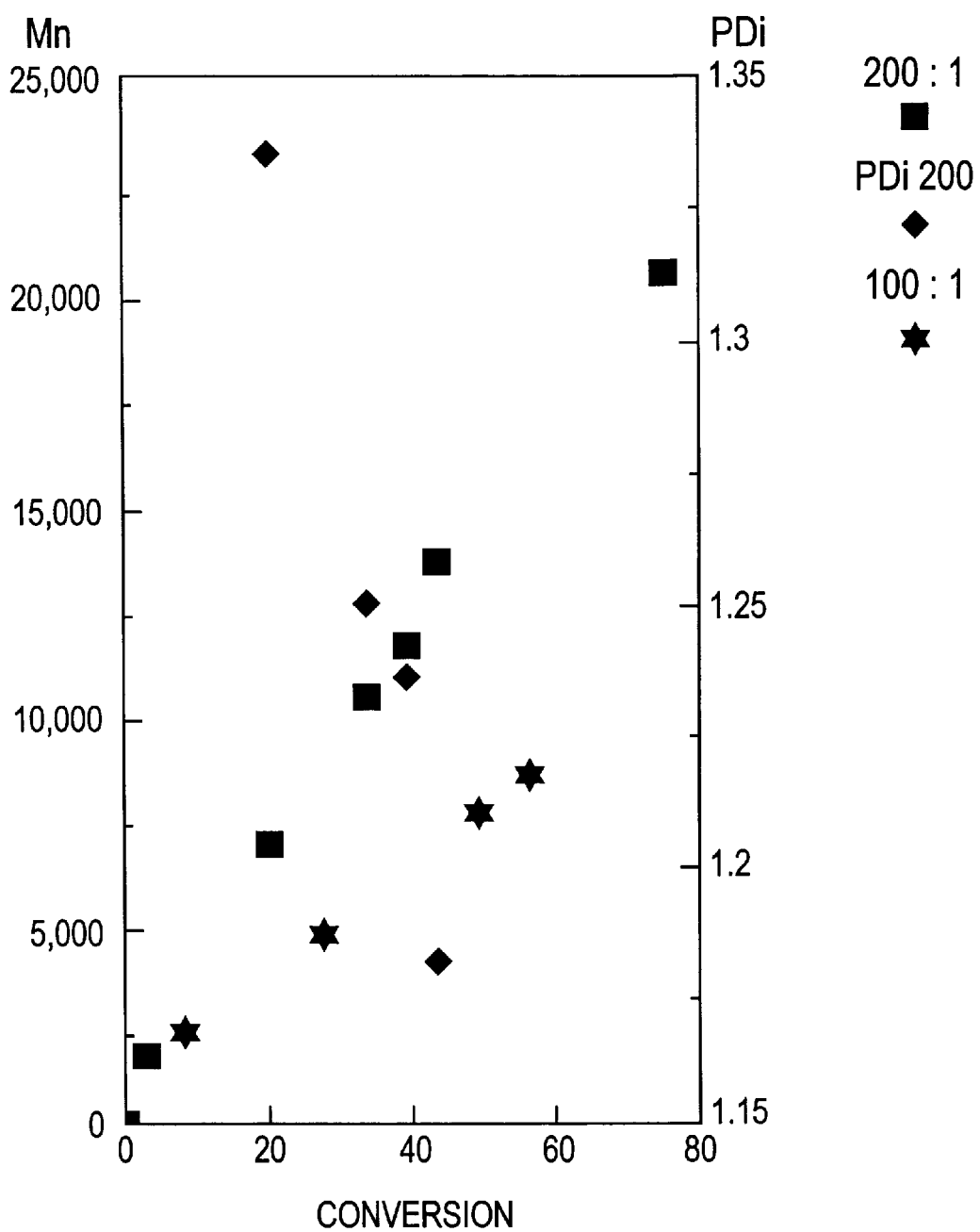

FIGS. 3 and 4 show Mn dependence on conversion at different monomer:initiator for styrene and methylmethacrylate at 80° C.

Figure 5:
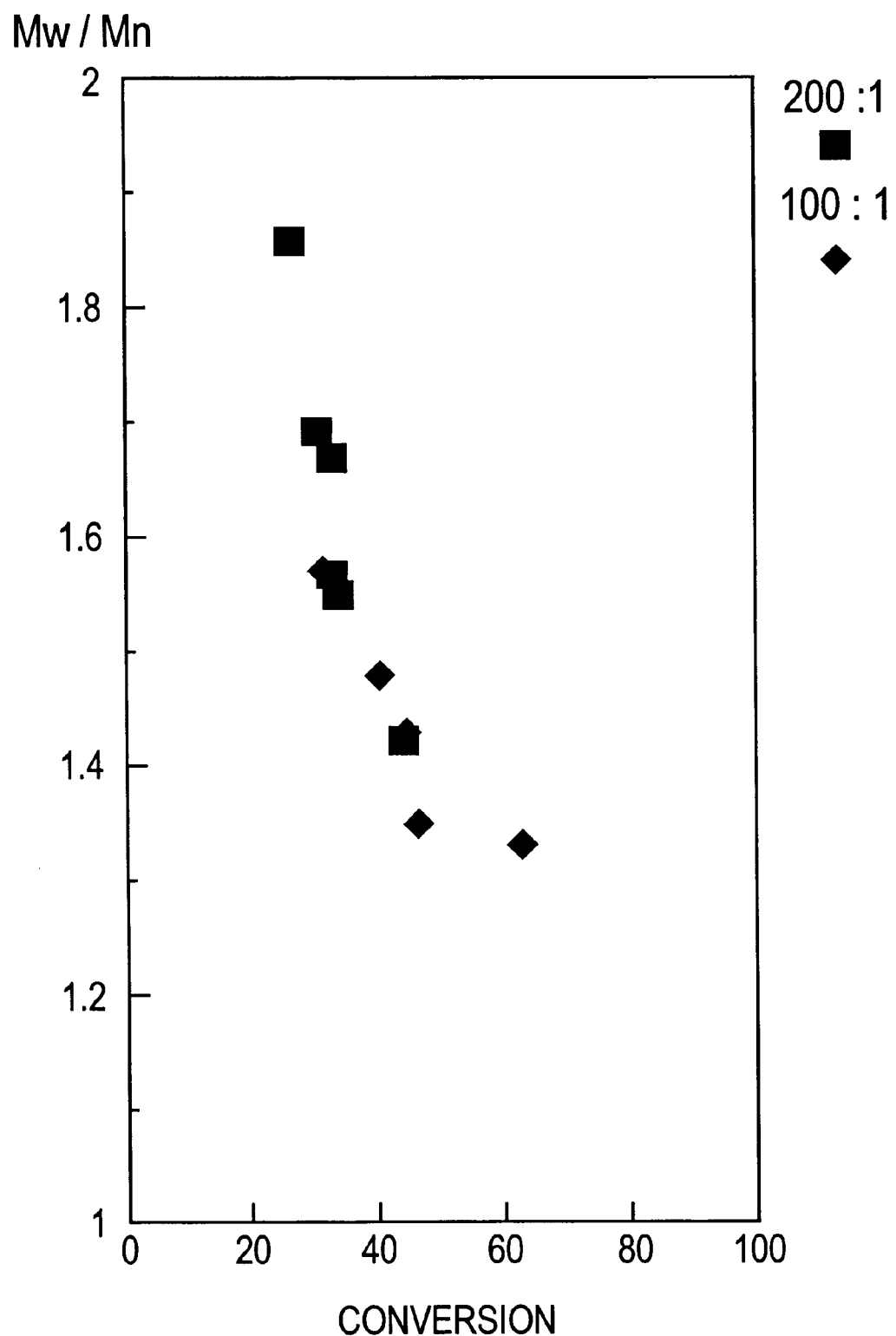
FIG. 5 shows Mw/Mn dependence on conversion for bulk polymerization of styrene at 80° C.

FIG. 5 shows Mw/Mn dependence on conversion for bulk polymerization of styrene at 80° C.

Figure 6:
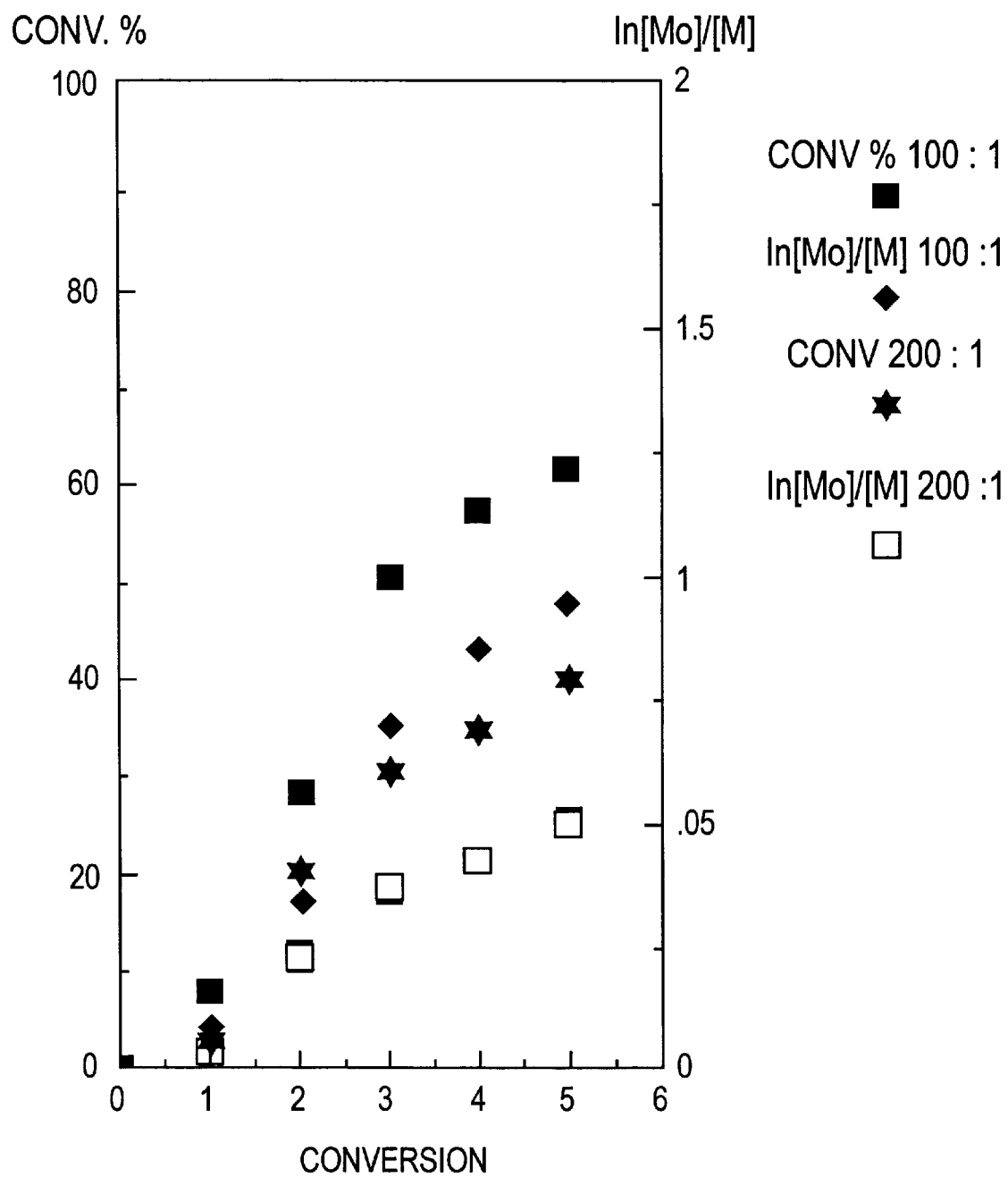
FIG. 6 shows kinetic plots for polymerization of methylmethacrylate at 90° C.

FIG. 6 shows kinetic plots for the polymerization of methylmethacrylate at 90° C.

Synthesis of Block Co-polymers

This was investigated using methylmethacrylate, benzylmethacrylate (BzMA) and 2 hydroxyethylmethacrylate (HEMA) the results of which are shown in the table below:

TABLE B

| BLOCK ONE | | | | BLOCK TWO | | | | % |
|---|---|---|---|---|---|---|---|---|
| Mon. | Mn | Mw | PDi | Mon. | Mn | Mw | PDi | MMA |
| MMA | 2,469 | 2,965 | 1.2 | MMA | 5,599 | 7,337 | 1.31 | 100 |
| MMA | 2,469 | 2,965 | 1.2 | BzMA | 4,908 | 6,500 | 1.32 | 70 |
| MMA | 2,499 | 3,431 | 1.37 | BzMA | 5,934 | 10,749 | 1.81 | 54 |
| MMA | 2,499 | 3,431 | 1.37 | HEMA | 3,298 | 5,544 | 1.68 | 70 |

Statistical Copolymers

An example of a statistical copolymer was produced using a compound of Formula 16B as initiator and a compound of Formula 45 as the ligand.

1 g of 2-hydroxyethyl methacrylate with 9.36g of MMA (I. e. 7.7. mole %) was polymerized with the following results:

| Initiator | Ligand | Amount ligand/ mL | Solvent (conc wt %) | Amt. CuBr/g | Amt. Initiator /g | Temp. ° C. | Time mins. |
|---|---|---|---|---|---|---|---|
| 16B | 45 | 0.37 | 33.3 | 0.13 | 0.16 | 90 | 2,760 |

| Results: | | |
|---|---|---|
| Mn | PDI | % HEMA (NMR) |
| 14,764 | 1.21 | 4.5 |

Further Experimentation

Further experimentation was also carried out using ligands of Formula 33.

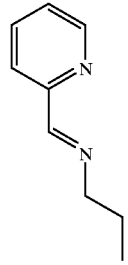

Formula 33

This was synthesized as follows:

30 mls of diethylether was placed in a conical flask. 1.78 mls of 2-pyridine carbaldehyde (2.00 g, $1.867 \times 10^{-2}$ moles) were added prior to 1.54 mls or propylamine (1.11 g, $1.873 \times 10^{-2}$ moles). The reaction mixture immediately turns yellow. The mixture was stored for 10 minutes at room temperature prior to the addition of magnesium sulfate and stirring for a further 30 minutes. The reaction mixture was filtered and the volatiles removed under reduced pressure. The product is isolated as a yellow oil.

Polymerization 0.688 g of copper (I) bromide (98% Aldrich)($4.796 \times 10^{-4}$ moles) were added to 10 mls of methylmethacrylate purified by passage down a column containing basic alumina and 3A sieves under nitrogen ($9.349 \times 10^{-2}$ moles) in 20 mls of xylene (deoxygenated by 3 freeze-pump-thaw cycles and dried over 3A sieves for 12 hours). 0.2136 g of A ($1.44 \times 10^{-3}$ moles) were added over 2 minutes with stirring at room temperature to give a homogenous deep red/brown solution. 0.07mls of ethyl 2-bromoisobutyrate (0.0924 g, $4.73 \times 10^{-4}$ moles) were added and the reaction mixture heated to 90° C. for 485 minutes. Samples were taken at intervals and analyzed for Mn and conversion, see table. After 485 minutes poly(methylmethacrylate) was isolated by precipitation into methanol in 78.6% yield with Mn=7020 and PDI (Mw/Mn)=1.27.

| TIME | % CONVERSION | Mn | PDI |
|------|--------------|------|------|
| 120 | 16.47 | 2376 | 1.28 |
| 240 | 52.69 | 5249 | 1.22 |
| 300 | 61.02 | 6232 | 1.18 |
| 360 | 67.56 | 6742 | 1.21 |
| 485 | 78.56 | 7020 | 1.27 |

The Production of α-hydroxy terminally functionalized PMMA

The initiator, ethyl-2-bromoisobutyrate was replaced with hydroxy containing alkyl bromide so as to produce -hydroxy terminally functionalized PMMA without the need to employ protecting group chemistry.

Ligands of Formula 33 were used in the polymerization process.

Figure 7:
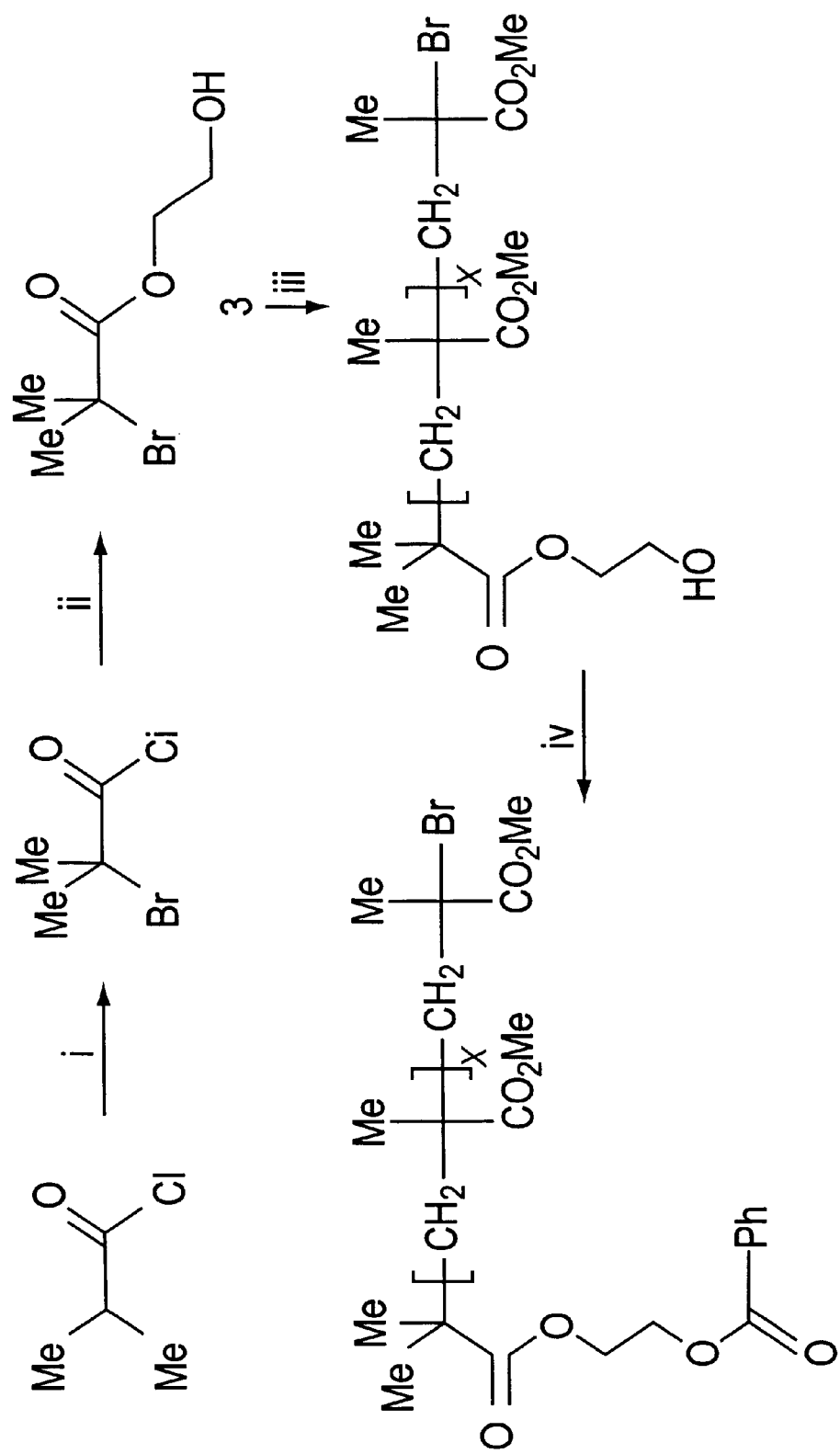
FIG. 7 shows the reaction scheme for the production of hydroxy terminally functionalized PMMA. (i) $Br_2$-P, (ii) Ethylene glycol, (iii) CuBr/3/MMA, (iv) benzoyl chloride.

2-hydroxyethyl-2'-methyl-2'bromopropionate was prepared as shown in FIG. 7.

The conditions used in steps (1) and (ii) was as follows: 0.25 g of red phosphorous ($8.06 \times 10^{-3}$ mol) were added to 35.4 ml (0.338 mol) of isobutyryl chloride. The mixture was placed under gentle reflux and 20ml of bromine (0.338 mol) were added slowly over 8 hours. The mixture was refluxed for a further 4 hours and the crude reaction mixture added slowly to 350 ml of anhydrous ethylene glycol (6.27 mol). The reaction mixture was refluxed for 4 hours, filtered into 500 ml of distilled water and the product extracted into chloroform. After washing with water and sodium hydrogen carbonate and drying over magnesium sulfate the product was isolated as a colorless liquid after the removal of solvent and vacuum distillation at 64.5° C. and 0.1 Torr. 'H NMR (CDCl$_3$, 373 K, 250.13 MHz) δ=4.30 (t, J 9.6 Hz, 2H), 3.85 (t, J 9.6 Hz, 2H) 1.94 s, 6H), $_{13}$C ('H) NMR (CDCl$_3$, 373 K, 100.6 mHz) δ=171.83, 67.30, 60.70, 55.72, 30.59, IR (NaCl, film) 3436 (Br), 2977, 1736 (s), 1464, 1391, 1372, 1278, 1168, 1112, 1080, 1023, 950, 644, E1 MS: 213, 211 (mass peaks), 169, 167, 151, 149, 123, 121. The typical polymerization procedure used (steps iii and iv) was as follows: 0.1376 of copper(1)bromide (98%, $9.6 \times 10^{-4}$ mol) were added to 40 ml of xylene and 20 ml of methyl methacrylate (0.187 mol). 0.4272 g of 2 ($2.89 \times 10^{-3}$ mol) were added and the mixture deoxygenated by one freeze-pump-thaw cycle prior to the addition of 0.2029 g of 3 ($9.61 \times 10^{-4}$) mol at room temperature. The deep red solution was heated at 90° C. for 70 minutes. The final product was isolated by precipitation into hexanes.

Atom transfer radical polymerization of MMA. using 3 as initiator in conjunction with 2 and CuBr was carried out at 90° C. in xylene [MMA]:[3]=20:1, [ligand]:[CuBr]:[3]= 3:1:1 to give PMMA of structure 4. Polymerization was stopped at low conversion, 7.65%, after 70 minutes, so as to reduce the amount of termination by radical-radical reactions, reaction A. 'H NMR data (FIG. 8), clearly shows the presence of the hydroxyethyl ester group, originating from 2 and the methoxy to the bromo group at the propagating end at δ4.28, 3.82 and 3.74 respectively. The number average molecular mass, Mn, can be calculated directly from NMR which gives a value of 2,430 which compares excellently with that obtained from size exclusion chromatography against PMMA standards of 2,320, PDI=1.12 (when precipitated into hexanes Mn–2960, PDI=1.12). This excellent agreement indicates that the product has structure 4. This is confirmed by matrix-assisted laser desorption-ionization time of flight mass spectrometry, FIG. 9. We see one series of peaks in the MALDI-TOF-MS indicating only one predominant structure i.e. 4. For example, the peaks at m/z 1319.0 and 1419.2 correspond to lithium adducts of 4 where x=10 and 11 respectively, calculated m/z 1318.3 and 1418.4. The narrow PDI of 4 is indicative of k(propagation) >k(termination) i.e. pseudo living polymerization. Control over Mn and PDI is obviously not affected detrimentally by the presence of primary alcohol group present in the initiator, which might have been expected to complicate the reaction by coordination to the copper catalyst. Indeed the PDI is narrower and the rate of polymerization faster with 3 than that obtained using a non-functional initiator. This is currently under investigation. Thus, controlled polymerization with the copper complex as catalyst can be used to give PMMA or structure 4 as the only detectable product under these conditions. The hydroxy group can be further reacted with benzoyl chloride to give 5 quantitatively.

Figures 8A, 8B, 8C:
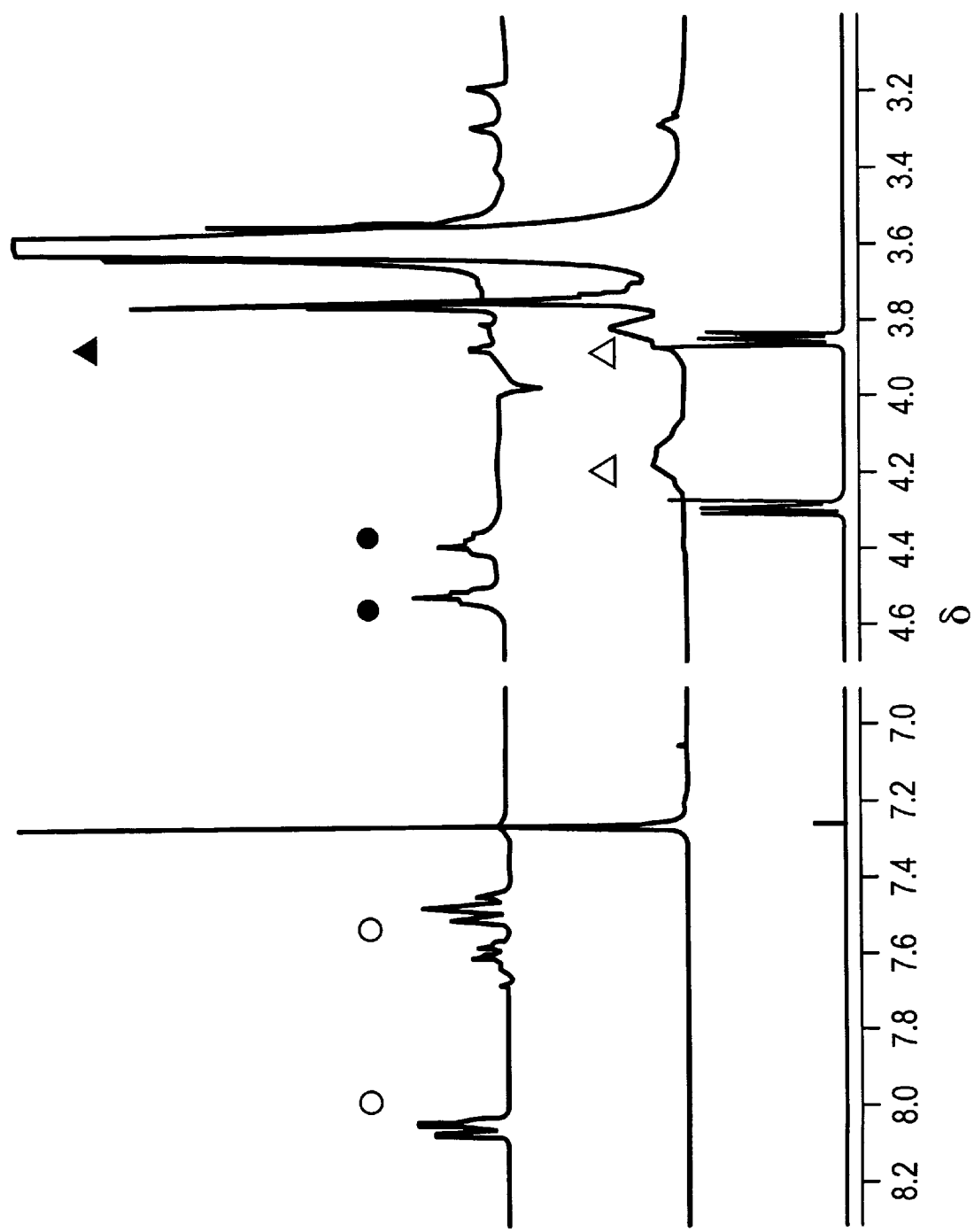
FIG. 8 shows a selected region from $^1$H NMR spectra of (a) 3, (b) 4 (c) 5.
Figure 9:
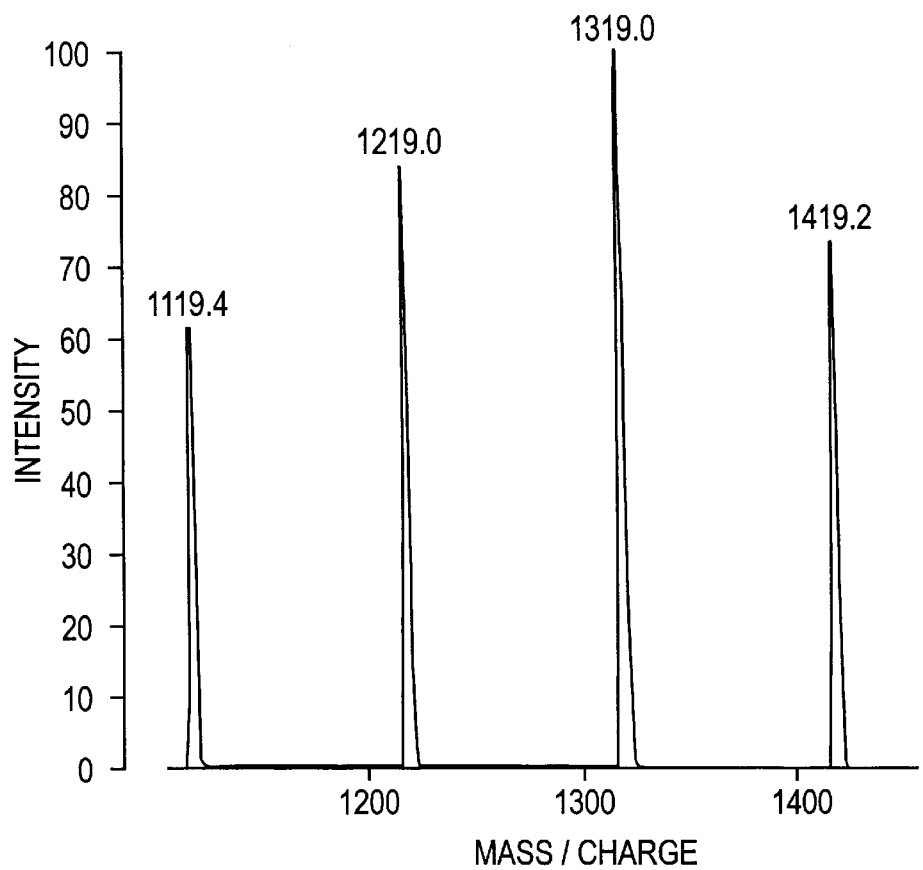
FIG. 9 shows partial MALDI-TOF-MS of 3 between x=8 and 11, peaks correspond to lithium adducts of molecular ions with no observable fragmentation.

The terminal benzoyl group of 5 is observed by 'H NMR, FIG. 8(c) and is detected by SEC with UV detection at 200 nm, 4 shows no absorption at this wavelength. MALDI TOF shows a new series of peaks corresponding to 5 e.g. peaks are now observed at m/z 1423.0 and 1522.8 for x=10 and 11, calculated m/z 1422.3 and 1522.4; this reaction is quantitative and no peaks from residual 4 are observed. When the reaction is carried out at a higher [MMA]:[3] ratio for 120 minutes a higher molecular weight polymer is produced, Mn=4540, PDI=1.22, as expected, reactions B and C. Again analysis shows terminal hydroxy functionally.

Figure 10:
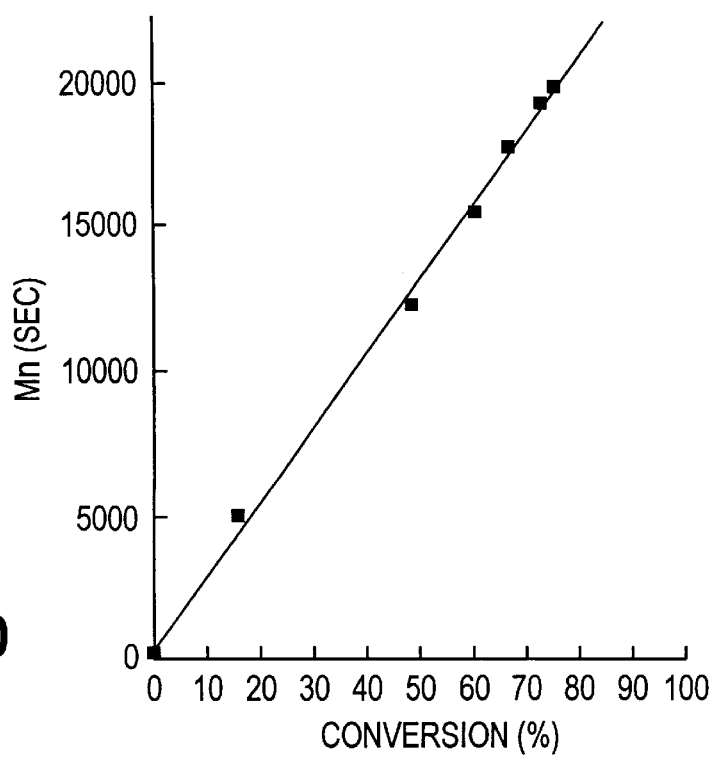
FIG. 10 shows a plot showing how Mn from SEC increases with conversion for experiments D–K.

Living or pseudo living polymerizations have a low rate of termination relative to rate of propagation. This is demonstrated by following a reaction with time, reactions D–K; L is the final product from this reaction. FIG. 10 shows that Mn increases linearly with conversion, up to approx. 80%, whilst PDI remains narrow for reaction with [MMA]:[3]–200. In this case the expected Mn (theory) at 100% conversion=[100/1×100.14 (mass of MMA)]+220 (mass of end groups)=20248. The PDI is broader than would be expected for a true living polymerization with fast initiation (theoretically 1+1/DP). However, PDI does not increase with increasing conversion as would be expected for a reaction with significant termination and this is most probably due to slow initiation relative to propagation. $_{12}$ In summary, atom transfer polymerization with the copper complex as catalyst and 3 as initiator leads to hydroxy functional PMMA. The presence of the hydroxy group during the polymerization does not reduce the control over the polymerization, and a narrow PDI polymer with controlled Mn is obtained. The reaction shows all the characteristics of a living/pseudo living polymerization. The structure of the product has been confirmed by MALDI-TOF-MS and NMR spectrometry. Furthermore the hydroxy functionality can be further functionalized by reaction with acid chlorides in a quantitative reaction.

| Reaction[d] | [3]/ 10[4] mol | [MMA]/ mol | t/min | Conversion (%)[d] | Mn SEC | PDI SEC |
|---|---|---|---|---|---|---|
| A[b] | 9.61 | 0.187 | 70 | — | 2530 | 1.10 |
| B[c] | 9.72 | 0.047 | 120 | — | 4540[e] | 1.22e |
| C[c] | 9.72 | 0.047 | 120 | — | 3130 | 1.22 |
| D[b] | 9.61 | 0.187 | 60 | 0.21 | — | — |
| E[b] | 9.61 | 0.187 | 120 | 2.27 | — | — |
| F[b] | 9.61 | 0.187 | 180 | 15.74 | 4980 | 1.21 |
| G[b] | 9.61 | 0.187 | 240 | 48.20 | 12330 | 1.26 |
| H[b] | 9.61 | 0.187 | 300 | 59.75 | 15580 | 1.29 |
| I[b] | 9.61 | 0.187 | 360 | 66.18 | 17920 | 1.27 |
| J[b] | 9.61 | 0.187 | 420 | 72.11 | 19500 | 1.27 |

-continued

| Reaction[d] | [3]/ 10[4] mol | [MMA]/ mol | t/min | Conversion (%)[d] | Mn SEC | PDI SEC |
|---|---|---|---|---|---|---|
| K[b] | 9.61 | 0.187 | 480 | 75.05 | 20100 | 1.28 |
| L[b] | 9.61 | 0.187 | 480 | — | 19427[e] | 1.31[e] |

[a]All reactions carried out with [2]:[CuBr]:[3] = 3:1:1.
[b]20 ml MMA in 40 ml xylene,
[c]5 mls MMA in 6 ml xylene.
[d]From gravimetry.
[e]After precipitation, otherwise as taken from reaction flask.

Further Examples of Initiators and Ligands

In order to demonstrate the effectiveness of the catalysts across the range of compounds chained, further experimentation was carried out.

Typical Polymerization Procedure

Methyl methacrylate (Aldrich) and xylene (AR grade, Fischer Scientific) were purged with nitrogen for 2 hours prior to use. The initiator, ethyl-2-bromoisobutyrate (98% Aldrich), and CuBr (99.999%, Aldrich) were used as obtained and 2-pyridinal $^{n-}$alkylimines were prepared as above. A typical reaction method follows. CuBr (0.134 g, [Cu]:[Initiator]=1:1) was placed in a pre-dried Schlenk flask which was evacuated and then flushed with nitrogen three times. Methyl methacrylate (10 ml) followed by 2-pyridinal $^{n-}$alkylimine ([ligand]:[Cu]=2:1) was added with stirring and, within a few seconds, a deep, brown solution formed. Xylene (20 ml) and, if appropriate, inhibitor were then added and the flask heated in a thermostat controlled oil bath to 90° C. When the solution had equilibrated ethyl-2-bromoisobutyrate (0.14 ml, [Monomer]:[Initiator]=100:1) was added. Samples were taken by pipette at certain times or the reaction followed by automated dilatometry. This apparatus consists of a glass capillary tube that is set on top of a reaction vessel. The vessel is charged with a complete reaction mixture that has been freeze-pump-thaw degassed to ensure no dissolved gases are released into the capillary. After the vessel is fitted, the capillary is filled with degassed solvent and the reaction mixture heated to the required temperature. During polymerization monomer is converted to polymer with a decrease in the volume of the mixture. This decrease in volume can be followed by watching the meniscus fall in the capillary, a process done in this case by an electronic eye controlled by a computer program.

Characterization of Polymers

Monomer conversion was calculated by gravimetry and/or $^1$H NMR and the molecular weights and molecular weight distributions (polydispersities) found by get permeation chromatography using tetrahydrofuran as eluent and the following columns (Polymer Laboratories): 5 μm guard and mixed-E (3000×7.5 mm), calibrated with PL narrow molecular weight poly(methyl methacrylate) standards with differential refractive index detection and/or UV.

| Exp. | Initiator Formula | Ligand Formula | Amount ligand/g | Solvent (conc wt %) | Amt. CuBr | Amt. Initiator/ mL | Temp. ° C. | Time mins. |
|---|---|---|---|---|---|---|---|---|
| 1 | 15 | 28 | 0.375 | 50 | 0.134 | 0.181 | 90 | 210 |
| 2 | 15 | 28 | 0.375 | 50 | 0.134 | 0.181 | 90 | 360 |
| 3 | 15 | 29 | 0.37 | 100 | 0.134 | 0.156 | 40 | 1440 |
| 4 | 15 | 33 | 0.273 | 33.3 | 0.134 | 0.137 | 90 | 240 |
| 5 | 15 | 40 | 0.273 | 33.3 | 0.134 | 0.137 | 90 | 1200 |
| 6 | 15 | 39 | 0.273 | 33.3 | 0.134 | 0.137 | 90 | 1320 |
| 7 | 15 | 44 | 0.25 | 33.3 | 0.134 | 0.137 | 90 | 2580 |
| 8 | 15 | 46 | 0.600 | 33.3 | 0.134 | 0.137 | 90 | 2580 |
| 9 | 15 | 32 | 0.610 | 33.3 | 0.134 | 0.137 | 90 | 300 |
| 10 | 15 | 49 | 0.423 | 33.3 | 0.134 | 0.137 | 90 | 1200 |
| 11 | 15 | 29 | 0.494 | 33.3 | 0.134 | 0.137 | 88 | 290 |
| 12 | 15 | 29 | 0.494 | 33.3 | 0.134 | 0.137 | 88 | 1260 |
| 13 | 15 | 31 | 0.536 | 33.3 | 0.134 | 0.137 | 90 | 1137 |
| 14 | 15 | 41 | 0.590 | 50 | 0.134 | 0.130 | 90 | 120 |
| 15 | 15 | 42 | 0.590 | 50 | 0.134 | 0.130 | 90 | 120 |
| 16 | 15 | 41 | 0.590 | 50 | 0.134 | 0.130 | 90 | 240 |
| 17 | 15 | 47 | 0.42 | 50 | 0.13 | 0.14 | 40 | 1050 |
| 18 | 15 | 47 | 0.42 | 50 | 0.13 | 0.14 | 40 | 2505 |
| 19 | 15 | 34 | 0.358 | 36 | 0.134 | 0.137 | 90 | 150 |
| 20 | 15 | 35 | 0.386 | 36 | 0.134 | 0.137 | 90 | 150 |
| 21 | 15 | 36 | 0.414 | 36 | 0.134 | 0.137 | 90 | 150 |
| 22 | 15 | 37 | 0.442 | 36 | 0.134 | 0.137 | 90 | 150 |
| 23 | 15 | 38 | 0.70 | 36 | 0.134 | 0.137 | 90 | 150 |
| 24 | 21 | 28 | 0.37 | 33.3 | 0.13 | 0.16 | 90 | 300 |
| 25 | 21 | 33 | 0.41 | 50 | 0.13 | 0.16 | 90 | 120 |
| 26 | 22 | 33 | 0.41 | 33.3 | 0.13 | 0.52 | 90 | 240 |
| 27 | 21 | 33 | 0.41 | 33.3 | 0.13 | 0.08 | 90 | 240 |
| 28 | 21 | 33 | 0.41 | 33.3 | 0.13 | 0.05 | 90 | 240 |
| 29 | 21 | 32 | 0.37 | 100 | 0.134 | 0.156 | 40 | 1440 |
| 30 | 21 | 32 | 0.37 | 33.3 | 0.134 | 0.156 | 90 | 300 |
| 31 | 23 | 29 | 0.37 | 33.3 | 0.134 | 0.178 | 90 | 270 |
| 32 | 23 | 29 | 0.37 | 33.3 | 0.134 | 0.178 | 90 | 1320 |
| 33 | 16B | 29 | 0.37 | 33.3 | 0.134 | 0.193 | 90 | 1320 |
| 34 | 16B | 45 | 0.45 g | 50 | 0.13 | 0.19 | 90 | 2760 |

-continued

| Exp. | Initiator Formula | Ligand Formula | Amount ligand/g | Solvent (conc wt %) | Amt. CuBr | Amt. Initiator/ mL | Temp. ° C. | Time mins. |
|---|---|---|---|---|---|---|---|---|
| 35 | 23 | 45 | 0.45 g | 50 | 0.13 | 0.19 | 90 | 2760 |
| 36 | 16B | 29 | 0.185 | 33.3* | 0.067 | 0.096 | 90 | 2880 |

*25 mL of MMA

| Exp. | Mn | PDI | % Conversion |
|---|---|---|---|
| 1 | 10818 | 1.28 | 100 |
| 2 | 5060 | 1.34 | 13.5 |
| 3 | 12310 | 1.70 | 91.6 |
| 4 | 9198 | 1.19 | 66 |
| 5 | 8717 | 1.49 | 87 |
| 6 | 31666 | 1.65 | 49 |
| 7 | 9054 | 2.71 | 2 |
| 8 | 5250 | 1.63 | 2 |
| 9 | 21318 | 1.78 | 86 |
| 10 | 53395 | 1.72 | 39 |
| 11 | 8990 | 1.16 | 55.6 |
| 12 | 15147 | 1.26 | 97.6 |
| 13 | 8710 | 1.36 | 47.1 |
| 14 | 4300 | 1.45 | 5 |
| 15 | 4700 | 1.65 | 10 |
| 16 | 6200 | 1.45 | 28 |
| 17 | 6577 | 1.27 | 47 |
| 18 | 11216 | 1.23 | 75 |
| 19 | 6500 | 1.18 | 60.0 |
| 20 | 7400 | 1.20 | 68.3 |
| 21 | 7320 | 1.20 | 72.1 |
| 22 | 7580 | 1.20 | 73.4 |
| 23 | 7900 | 1.23 | 73.4 |
| 24 | 11710 | 1.30 | |
| 25 | 28314 | 1.19 | |
| 26 | 7700 | 1.14 | |
| 27 | 28330 | 1.15 | 68.5 |
| 28 | 36380 | 1.17 | 50.6 |
| 29 | 23780 | 1.07 | 38.5 |
| 30 | 26640 | 1.17 | 52.52 |
| 31 | 2177 2135 (by NMR) | 1.10 | |
| 32 | 1000 | 1.11 | 3.8 |
| 33 | 1900 | 1.08 | 20.3 |
| 34 | 11009 | 1.08 | |
| 35 | 10200 | 1.13 | |
| 36 | 23700 | 1.13 | |

What is claimed is:

1. A catalyst for addition polymerization of olefinically unsaturated monomers comprising:

a) a first compound MY wherein M is a transition metal in a low valency state or a transition metal in a low valency state coordinated to at least one coordinating non-charged ligand; and Y is a monovalent, divalent or polyvalent counterion;

b) an initiator compound comprising a homolytically cleavable bond with a halogen atom; and c) an organodiimine, wherein at least one of the nitrogens of the diimine is not part of an aromatic ring.

2. A catalyst according to claim 1 wherein the organodiimine is selected from the group consisting of:

a 1,4-diaza-1,3-butadiene

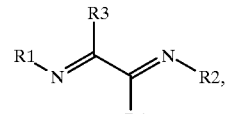

Formula 24 a 2-pyridine carbaldehyde imine

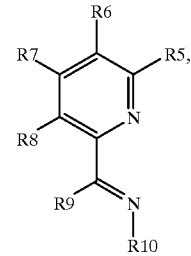

Formula 25 an oxazolidone

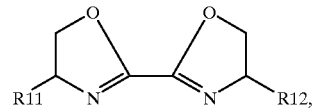

Formula 26 or a quinoline carbaldehyde

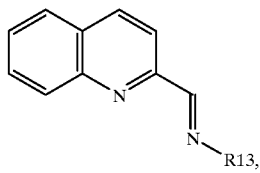

Formula 27 wherein $R_1$, $R_2$, $R_{10}$, $R_{11}$, $R_{12}$, and $R_{13}$ are independently selectable and may be selected from the group consisting of H, straight chain, branched chain or cyclic saturated alkyl, hydroxyalkyl, carboxyalkyl, aryl, $CH_2Ar$, wherein Ar is aryl or substituted, or a halogen;

$R_3$ to $R_9$ are independently selectable and may be selected from the group consisting of H, straight chain, branched chain or cyclic alkyl, hydroxyalkyl, carboxyalkyl, aryl $CH_2$ Ar, a halogen, $OCH_{2n+1}$, wherein n is an integer of 1 to 20, $NO_2$, CN, O=CR wherein R=alkyl, aryl, substituted aryl, benzyl $PhCH_2$ or a substituted benzyl.

3. A catalyst according to claim 2 wherein $R_1$ to $R_{13}$ are selected from the group consisting of $C_1$ to $C_{20}$ alkyl, $C_1$ to $C_{20}$ hydroxyalkyl, $C_1$ to $C_{20}$ carboxyalkyl, n-propylisopropyl, n-butyl, sec-butyl, tert-butyl, cyclohexyl, 2-ethylhexyl, octyldecyl and lauryl.

4. A catalyst according to claim 2, wherein the organo-diimine comprises a chiral center.

5. A catalyst according to claim 2 wherein one or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups are selected from the group consisting of alkyl, cycloalkenyl, polycycloalkyl, polycycloalkenyl and cyclicaryl, containing 5 to 8 carbon atoms.

6. A catalyst according claim 1 wherein M is selected from the group consisting of Cu(I), Fe(II), Co(II), Ru(II), Ni(II) Sm(II), Ag(I) and Yb(II).

7. A catalyst according claim 1, wherein Y is selected from the group consisting of Cl, Br, I, $NO_3$, $PF_6$, $BF_4$, $SO_4$ and $CF_3$ $SO_3$, CN, SPh, ScN and SePh.

8. A catalyst according to claim 1, wherein the initiator is selected from the group consisting of:

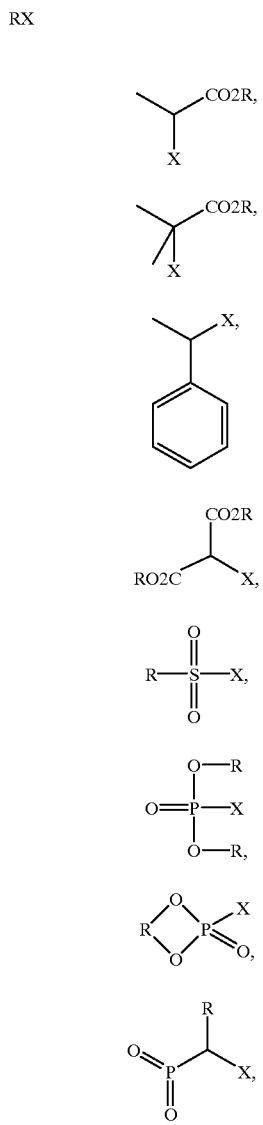

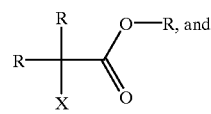

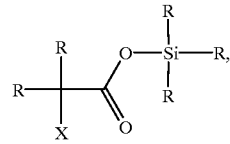

wherein R is independently selectable and is selected from the group consisting of straight chain alkyl, branched chain alkyl, cyclic alkyl, hydrogen, substituted alkyl, hydroxyalkyl, carboxyalkyl, aryl and substituted aryl and substituted benzyl, and wherein X=a halide.

9. A catalyst according to claim 8, wherein the initiator is

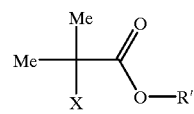

wherein:
X=Br, I or Cl, r
R'=—H,
—$(CH_2)_p R''$, wherein p is a whole number and R''=H, OH, $NH_2$, $SO_3H$, COOH, halide, COX, where X is Br, I or Cl, or

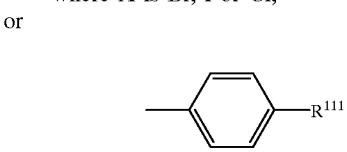

$R^{111}$=—COOH, —COX, where X is Br, I or Cl, , —OH, —$NH_2$ or —$SO_3H$.

10. A catalyst according to claim 9 wherein b is 2-hydroxyethyl-2'bromopropionate.

11. A method for addition polymerization of one or more olefinically saturated monomers comprising:
addition polymerizing one or more olefinically saturated monomers using the catalyst of claim 1.

12. The method according to claim 11, wherein the addition polymerization is conducted at a temperature between –20° C. to 200° C.

13. The method according to claim 12, wherein the addition polymerization is conducted at a temperature between 20° C. and 130° C.

14. The method according to claim 11, wherein the olefinically saturated monomers are selected from methyl methacrylate, ethyl methacrylate, propyl methacrylate including all isomers thereof, butyl methacrylate including all isomers thereof, other alkyl methacrylates, corresponding acrylates, functionalized methacrylates and acrylates fluoroalkyl (meth)acrylates, methacrylic acid, acrylic acid, fumaric acid and esters thereof, itaconic acid and esters thereof, nucleic anhydride, styrene, α-methyl styrene, vinyl halides, acrylonitrile, methacrylonitrile, vinylidene halides of formula $CH_2$—$C(Hal)_2$ wherein each halogen is independently Cl or F, optionally substituted butadiene of the formula $CH_2=C(R_{15})C(R_{15})=CH_2$ wherein $R_{15}$ is independently H, Cl to C10 alkyl, Cl or F, sulphonic acids or derivatives thereof of formula $CH_2=CHSO_2OM$ wherein M is NaS, K, Li, $NR_{16})_4$, or $-(CH_2)_2-D$ wherein each $R_{16}$ is independently H or Cl or C10 alkyl, D is $CO_2Z$, OH, $NR_{16})_2$ or $SO_2OZ$ and Z is H. Li, Na, K or $NR_{16})_4$, acrylamide or derivatives thereof of formula $CH_2-C(CH_3)CON(R_{16})_2$, and wherein mixtures thereof.

15. The method according to claim 11, wherein the polymerization is conducted in water, a protic solvent or a nonprotic solvent.

16. A method for producing a statistical copolymer, a block polymer, a telechelic polymer or a comb and graft copolymer of monomers, the method comprising:

producing at least one of a statistical copolymer, a block polymer, a telechelic polymer and a comb and graft copolymer of monomers using the catalyst of claim 1.

17. A catalyst for addition polymerization of olefinically unsaturated monomers comprising:

(a) a first component of formula $(ML_m)^{n+}A^{n-}$ wherein
M=a transition metal of low valency state;
L=an organodiimine where at least one of the nitrogens of the diimine is not part of an aromatic ring;
A=an anion;
n=an integer from 1 to 3;
m=and integer from 1 to 2; and (b) an initiator compound comprising a homolytically cleavable bond with a halogen atom.

18. A catalyst according to claim 17, wherein A is selected from the group consisting of Cl, Br, F, I, $NO_3$, $SO_4$ and $CuX_2$, wherein X is a halogen.

* * * * *

(12) EX PARTE REEXAMINATION CERTIFICATE (5882nd)
United States Patent
Haddleton

(10) Number: US 6,310,149 C1
(45) Certificate Issued: Sep. 4, 2007

(54) POLYMERIZATION CATALYST AND PROCESS

(75) Inventor: David Mark Haddleton, Kenilworth (GB)

(73) Assignee: Warwick Effect Polymers Limited, Coventry (GB)

Reexamination Request:
No. 90/007,535, May 12, 2005

Reexamination Certificate for:
Patent No.: 6,310,149
Issued: Oct. 30, 2001
Appl. No.: 09/202,096
Filed: Feb. 1, 1999

(22) PCT Filed: Jun. 12, 1997
(86) PCT No.: PCT/GB97/01589
§ 371 (c)(1),
(2), (4) Date: Feb. 1, 1999
(87) PCT Pub. No.: WO97/47661
PCT Pub. Date: Dec. 18, 1997

(30) Foreign Application Priority Data

Jun. 12, 1996 (GB) .............................................. 9612265
Apr. 7, 1997 (GB) .............................................. 9707024

(51) Int. Cl.
*C08F 10/00* (2006.01)
*C08F 4/10* (2006.01)
*C08F 4/00* (2006.01)

(52) U.S. Cl. ........................ 526/89; 526/172; 502/104; 502/162; 556/110; 556/138; 556/32

(58) Field of Classification Search ........................ None
See application file for complete search history.

(56) References Cited

U.S. PATENT DOCUMENTS 4,728,706 A * 3/1988 Farnham et al. ............. 526/172

4,940,760 A * 7/1990 Boettcher et al. ........... 526/190

(Continued)

FOREIGN PATENT DOCUMENTS

WO   WO 96/30421   10/1996

(Continued)

OTHER PUBLICATIONS

M. Svoboda et al., "Diazadien–Nickel–Alkyle", Journal of Organometallic Chemistry, vol. 191 (1980), pp. 321–328.*

(Continued)

*Primary Examiner*—Alan Diamond

(57) ABSTRACT

A catalyst is provided for addition polymerization of olefinically unsaturated monomers comprising a first compound MY, wherein M is a transition metal in a low valency state or a transition metal in a low valency state coordinated to at least one coordinating non-charged ligand, Y is a monovalent, divalent or polyvalent counterion; an initiator compound comprising a homolytically breakable bond with a halogen atom; and an organodiimine, where at least one of the nitrogens of the diimine is not part of an aromatic ring. A catalyst for addition polymerization of olefinically unsaturated monometers is also provided comprising a first component of Formula $$[ML]^{n+}A^{n-},$$

wherein M=a transition metal of low valency state, L=an organodiimine where at least one of the nitrogens of the diimine is not part of an aromatic ring, A=an anion, n=an integer of 1 to 3, m=an integer of 1 or 2;

e) An initiator compound comprising a homolytically breakable bond with a halogen atom.

Preferably, the organodiimine is a 1,4-diaza-1,3-butadiene, a pyridine carbaldelyde imine, an oxazolidone or a quinoline carbaldehyde.

Processes for using the catalysts are also disclosed.

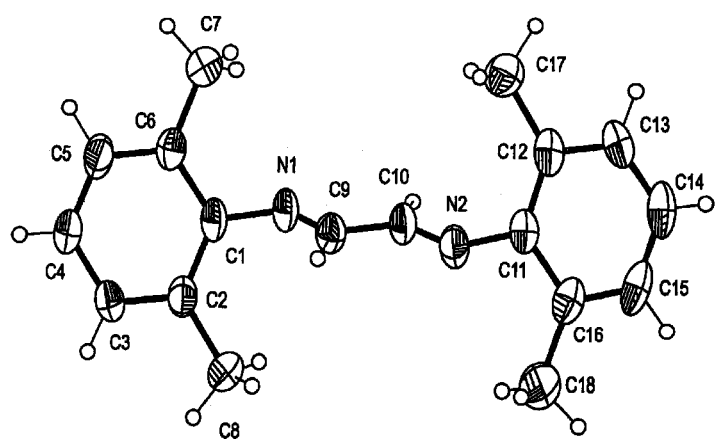

U.S. PATENT DOCUMENTS

| | | | |
|---|---|---|---|
| 5,763,548 | A | 6/1998 | Matyjaszewski et al. |
| 6,310,149 | B1 | 10/2001 | Haddleton et al. |
| 6,432,995 | B2 | 8/2002 | Hickey |
| 6,458,950 | B1 | 10/2002 | Nishitani et al. |
| 6,624,263 | B2 | 9/2003 | Matyjaszewski et al. |

FOREIGN PATENT DOCUMENTS

| | | | |
|---|---|---|---|
| WO | WO 97/18247 | | 5/1997 |
| WO | WO 98/01480 | * | 1/1998 |
| WO | WO 98/03521 | * | 1/1998 |

OTHER PUBLICATIONS

G. Van Koten et al., "1,4–Diaza–1,3–butadiene (a–Diimine) Ligands: Their Coordination Modes and the Reactivity of their Metal Complexes, Advances in Organometallic Chemistry", 1982, vol. 21, pp. 151–239.*

V. Percec et al., "'Living' Radical Polymerization of Styrene Initiated by Arenesulfonyl Chlorides and Cu(I)(bpy)nCl", Macromolecules, vol. 28, (1995), pp. 7970–7972.*

C. Granel et al., "Controlled Radical Polymerization of Methacrylic Monomers in the Presence of a Bis(ortho–chelated) Arylnickel(II) Complex and Different Activated Alkyl Halides", Macromolecules, vol. 29, (1996), pp. 8576–8582.*

Wang, Yun–Pu et al., "Synthesis and Selective Catalytic Oxidation Properties of Polymer–Bound Melamine Copper(II) Complex", Reactives & Functional Polymers, 1997, vol. 33, pp. 81–85.*

Sawamoto, Mitsuo et al., "Design and Mechanism of Living Cationic and Radical Polymerizations", International Symposium on Ionic Polymerization, Istanbul Technical Unviersity, Sep. 4–8, 1995, p. 11.*

Mitsuru Kato et al., "Polymerization of Methyl Methacrylate with the Carbon Tetrachloride/Dichlorotris–(triphenylphospine) ruthenium (II)/Methylaluminum Bis(2,6–di–tert–butylphenoxide) Initiating System: Possibility of Living Radical Polymerization", Macromolecules, 1995, vol. 28, pp. 1721–1723.*

Nishikawa, Tomotaka, et al., "Evidence for Living Radical Polymerization of Methyl Methacrylate with Ruthenium Complex: Effects of Protic and Radical Compounds and Reinitiation from the Recovered Polymers," Macromolecules, 1997, vol. 30, pp. 2244–2248.*

Haddleton, David M., et al., "Polymerization of Styrene Using a Soluble Copper (I) Compound in Conjuction with an Alkyl Bromide", Papers presented at the San Francisco, California, meeting of the American Chemical Society, Division of Polymer Chemistry, Inc., vol. 38, No. 1, pp. 679–680, Apr. 1997.

Haddleton, David M., et al., "The Effect of Phenols on Atom Transfer Radical Polymerization (ATRP) of Methyl Methacrylate and Styrine", Papers presented at the San Francisco, California, meeting of the American Chemical Society, Division of Polymer Chemistry, Inc., vol. 38, No. 1, pp. 738–739, Apr. 1997.

Stump, Mark A., et al., "Polymerization of Methyl Methacrylate Using a Novel Chromium Compound", Papers presented at the San Francisco, California, meeting of the American Chemical Society, Division of Polymer Chemistry, Inc., vol. 38, No. 1, pp. 508–509, Apr. 1997.

Patten, Timothy E., et al., "Polymers with Very Low Polydispersities from Atom Transfer Radical Polymerization," Science, 272: 866–868 (1996).

Percec, Virgil, et al., "Metal–Catalyzed 'Living' Radical Polymerization of Styrene Initiated with Arenesulfonyl Chlorides. From Heterogenous to Homogeneous Catalysis," Macromolecules, 29: 3665–3668 (1996).

Paik, Iyun–jong and Matyjaszewski, Krzysztof, "Kinetic Studies of Atom Transfer Radical Polymerization of Methyl Acrylate," Carnegie Mellon University,published Mar. 4, 1996 (American Chemical Society): 274–275.

Patten, Timothy E., et al.,"Radical Polymerization Yielding Polymers with $M_w/M_a$~1.05 by Homogeneous Atom Transfer Radical Polymerization," Carnegie Mellon University, published Mar. 4, 1996 (America Chemical Society): 575–576.

Wang, Jin–Shan and Matyjaszewski, Krzysztof, "Controlled/'Living' Radical Polymerization. Halogen Atom Transfer Radical Polymerization Promoted by a Cu(I)/Cu(II) Redox Process," Macromolecules, 28(23): 7901–7910 (1995).

Wang, Jin–Shan, et al., "Atom Transfer Radical Polymerization (ATRP): A New Approach Towards Well–Defined (Co)polymers," Polym. Mat. Sci. Eng., 73:416 (1995).

Wang, Jin–Shan and Matyjaszewski, Krzysztof, "Transition Metal Catalyzed Atom Transfer Radical Polymerization (ATRP): Principle and Mechanism," Polym, Mat. Sci. Eng., 73: 414 (1995).

Wang, Jin–Shan and Matyjaszewski, Krzysztof, "Living'/Controlled Radical Polymerization. Transition–Metal–Catalyzed Atom Transfer Radical Polymerization in the Presence of a Conventional Radical Intitiator," Macromolecules, 28: 7572–7573 (1995).

Wang, Jin–Shan and Matyjaszewski, Krzysztof, "Controlled/'Living' Radical Polymerization. Atom Transfer Radical Polymerization in the Presence of Transition–Metal Complexes," J. Am. Chem. Soc., 117: 5614–5615 (1995).

Van der Graaf, Tim et al., "Metal to Ligand Charge–Transfer Photochemistry of Metal–Metal–Bonded Complexes. Photochemistry of $(CO)_5MnMn(CO)_3$ (α–diimine) Complexes. Coupling Reactions of the Radicals Formed and X–ray Structure of the Photoproduct $(CO)_4Mn(\sigma-N',\eta^2-CN-i-Pr-pyca)Mn(CO)_3$," Inorganic Chemistry, 30(4): 599–608 (1991).

Maroney, Michael J., et al., "Electronic Structure of Copper Complexes Containing α–Diimine Ligands," Inorganic Chemistry, 23(15): 2261–2270 (1984).

Leupin, Peter and Schläpfer, Carl Wilhelm, "Resonance Raman Spectra of Copper (I) Complexes with α–Diimine Ligands," J. Chem. Soc. Dalton Trans.: 1635–1640 (1983).

Kato, Mitsuro, et al., "Polymerization of Methyl Methacrylate with the Carbon Tetrachloride/Dichlorotris–(triphenylphosphine)ruthenium(II)/Methylaluminum Bis(2,6–di–tert–butylphenoxide) Initiating System: Possibility of Living Radical Polymerization," Macromolecules, 28: 1721–1723 (1995).

van Koten, Gerard and Vrieze, Kees, "Interaction of Metal Centres with the 1,4–diaza–1,3–butadiene (α–diimine) ligand. Versatile Coordination Chemistry and Applications in Organic Synthesis and Catalysis," (Rescued Review) University of Amsterdam.

van de Kuil, Lucia A., et al.,"Organonickel(II) Complexes Containing Aryl Ligands with Chiral Pyrrolldinyl Ring Systems; Syntheses and Use as Homogeneous Catalysts for the Kharasch Addition Reaction," Recl. Trav. Chim. Pays–Bas, 113: 267–277 (1994).

van de Kuil, Lucia A., et al., "New Soluble Polysiloxane Polymers Containing a Pendant Terdentate Aryldiamine Ligand Substituent Holding a Highly Catalytically Active Organometallic Nickel(II) Center," *Chem. Mater*, 6: 1675–1683 (1994).

Haddleton, David M., et al., "Identifying the Nature of the Active Species in the Polymerization of Methacrylates: Inhibition of Methyl Methacrylate Homopolymerizations and Reactivity Ratios for Copolymerization of Methyl Methacrylate/n–Butyl Methacrylate in Classical Anionic, Alkyllithium/Trialkylaluminum–Initiated, Group Transfer Polymerization, Atom Transfer Radical Polymerization, Catalytic Chain Transfer, and Classical Free Radical Polymerization," *Macromolecules*, 30: 3992–3998 (1997).

Exam 1 Chemistry, 345:1–4 (2003), http://genchem.chem.wisc.org/organic/so3/nelson/handouts/ex1–key.pdf.

A. Aldrich, Methacetin–p. 1088, Strontium–p. 1571, Vinylaceta–p. 1780 and Vinylbiphe–p. 1781 (2000–2001, United Kingdom). Available online at www.sigma.aldrich.com.

Clark, Dr. Andrew J., Report for Warwick Effect Polymers, Dec. 18, 2002.

Harrison, Simon et al., "$^{13}$C Kinetic Isotope Effects in the Copper(1)–Mediated Living Radical Polymerization of Methyl Methacrylate," *The Royal Society of Chemistry*: 1470–1471 (2002).

Bellus, Daniel, "Copper–Catalyzed Additions of Organic Polyhalides to Olefins: a Versatile Synthetic Tool," *Pure & Appl. Chem*, 57: 1827–1838 (1985).

Clark, Andrew J., "Atom Transfer Cyclisation Reactions Mediated by Copper Complexes," *Chem. Soc. Rev.*, 31: 1–11(2002).

Udding, Jan H., et al., "Transition Metal–Catalyzed, Chlorine–Transfer Radical Cyclizations of 2–(3–Alken–1–oxy)–2–Chloroacetates. Formal Total Synthesis of Avenaciolide and Isoavenaciolide," *J. Org, Chem.*, 59: 1993–2003 (1994).

Cyclisation of the Trichloracetamide (288): 121–123, date unknown.

Davies, David T., et al., "Copper(I) Reactions in N–Heterocycle Synthesis: Efficient Preparation of Substituted Pyrrolidinones," *Tetra. Letters* (1999).

Thesis by McDonagh, J.P., 2.3 Copper(I) Mediated Cyclisation of Trichloroacetamides, pp. 49–51 (2001).

Thesis by G. Battle, 3.3.3 Cyclisation of monobromo–N–Propargylacetamides, pp. 114–118, date unknown.

Clark, Andrew J., et al., "Atom Transfer Radical Cyclisations of Activated and Unactivated N–Allylhaloacetamides and N–Homoallylhaloacetamides Using Chiral and Non–Chiral Copper Complexes," *J. Chem. Soc., Perkin Trans., 1*: 671–680 (2000).

de Campo, Floryan, et al., "New and Improved Catalysts for Transition Metal Catalysed Radical Reactions," *Chem. Commun.*: 2117–2118 (1998).

Hannon, Dr. Michael J., "Differences Between Di–Imine and Pyridylimine Ligands and the Widely–Used 2,2'–Bipyridine Ligands," *Report for Warwick Effect Polymers* (Jan. 28, 2002).

Hamblin, Jacqueline, et al., "Triple Helicates and Planar Dimers Arising From Silver($_I$) Coordination to Directly Linked Bis–Pyridylimine Ligands," *J. Chem. Soc., Dalton Trans.*: 1635–1641 (2002).

Schadt, Mark J., and Lees, Alistair J., Photolysis of Group 6 Metal Hexacarbonyl Solutions Containing Diimine Ligands. Spectral Characterization and Reaction Kinetics of a Photoproduced Intermediate, Monodentate M(CO)$_5$(Diimine), *Inorg. Chem.*, 25: 672–677 (1986).

Morao, Inaki et al., "In–Plane Aromaticity in 1,3–Dipolar Cycloadditions," *J. Org. Chem.*, 62: 7033–7036 (1997).

Feng, Yong, et al., "C—H and N—H Bond Dissociation Energies of Five– and Six–Membered Ring Aromatic Compounds," *J. Phys. Org. Chem.*, 16: 883–890 (2003).

March, Jerry, Sections 6–13 and 6–14 in *Advanced Organic Chemistry* (Reactions, Mechanisms, and Structure), 3$^{rd}$ edition John Wiley & Sons, Inc. (1985).

Haddleton, David M., et al., "Atom Transfer Polymerization of Methyl Methacrylate Mediated by Alkylpyridylmethanimine Type Ligands, Copper(I) Bromide, and Alkyl Halides in Hydrocarbon Solution," *Macromolecules*, 32: 2110–2119 (1999).

Perrier, Sebastien, et al., "Living Radical Polymerization of Styrene Mediated by Copper(I)/ N–n–Alkyl–2–Pyridylmethanimine Catalysts," *Macromolecules*, 35: 2941–2948 (2002).

Nobelli, I. et al., "Hydrogen Bonding Properties of Oxygen and Nitrogen Acceptors in Aromatic Heterocycles," *J. Computational Chemistry*, 18(16): 2060–2074 (1997).

Singleton, Daniel A., et al., "Isotope Effects and Mechanism of Atom Transfer Radical Polymerization," *Macromolecules*, 36: 8609–8616 (2003).

Haddleton, David M., et al., "Atom Transfer Radical Polymerization of Methyl Methacrylate Initiated by Alkyl Bromide and 2–Pyridinecarbaldehyde Imine Copper(I) Complexes," *Macromolecules*, 30: 2190–2193 (1997).

Haddleton, David M., et al., "Monohydroxy Terminally Functionalised Poly(Methyl Methacrylate) From Atom Transfer Radical Polymerisation," *Chem. Commun.*: 683–684 (1997).

Matyjaszewski, Krzysztof, et al., "Controlled/'Living' Radical Polymerization. Kinetics of the Homogenous Atom Transfer Radical Polymerization of Styrene," *J. Am. Chem. Soc.*, 119 674–680 (1997).

Udding, Jan H., et al., "Radical Transfer Catalysis versus Lewis Acid Catalysis by the Copper($_I$) Chloride–2,2'–Bipyridine Complex: the Effect of the Structure of the Ligand," *J. Chem. Soc. Perkin Trans.*: 1529–1530 (1992).

Matyjaszewski, Krysztof, and Davis, Thomas P., Chapter 11 in the *Handbook of Radical Polymerization*, Wiley–Interscience (A John Wiley & Sons, Inc. Publication, 2002).

Childs, Laura Jennifer, Chapters 2, 4, 5 & 6 in *Supramolecular Assemblies Based on Imine and Azo Chemistry*, submitted for the degree of Ph.D. to the Department of Chemistry, University of Warwick (Oct. 2002).

Balaban, Alexandru, et al., Aromaticity as a Cornerstone of Heterocyclic Chemistry, *Chem. Rev.*, 104: 2777–2812 (2004).

Darling, Thomas R., et al., "Living Polymerization: Rationale for Uniform Terminology," *J. Polymer Science: Part A: Polymer Chemistry*, 38: 1706–1752 (2000).

Kamigaito, Masami, et al., "Metal–Catalyzed Living Radical Polymerization," *Chem. Rev.*, 101: 3689–3745 (2001).

Matyjaszewski, Krzysztof and Xia, Jianhui, "Atom Transfer Radical Polymerization," *Chem. Rev.*, 101: 2921–2990 (2001).

D18, paper entitled "Report by University of Warwick," pp. 1–54, date unknown.

Amendola, Valeria, et al., "Electrochemical Assembling/Disassembling of Helicates with Hysteresis," *Inorg. Chem., 40*: 3579–3587 (2001).

March, Jerry, pp. 784, 785, 796 & 797 in *Advantage Organic Chemistry* (Reactions, Mechanisms, and Structure), 3$^{rd}$ edition John Wiley & Sons, Inc. (1985).

Fox, Mary Anne and Whitesell, James K., pages from Chapter 12 in *Organic Chemistry*, Jones and Batlett Publishers, Inc. (1994).

Wang, Aileen R. and Zhu, Shiping, "ESR Study on Diffusion–Controlled Atom Transfer Radical Polymerization of Methyl Methacrylate and Ethylene Glycol Dimethacrylate," *Macromolecules,* 35: 9926–9933 (2002).

D40, paper entitled "Oxazoline and Bisoxazoline Catalysts," date unknown.

"Curriculum Vitae" with cover letter dated Jan. 8, 2003 from Dr. Claudio Bianchini (Director of ICCOM–CNR, Firenze, Italy).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 57–61:

$R_3$ to $R_9$ may independently be selected from the group described for $R_1$, $R_2$, $R_{10}$, $R_{11}$, $R_{12}$ and $R_{13}$ or additionally $OC_nH_{2n+1}$ (wherein n is an integer from 1 to 20), $NO_2$, CN or O=CR (where R=alkyl, benzyl $PhCH_2$ or a substituted benzyl, preferably a $C_1$ to $C_{20}$ alkyl, especially a $C_1$ to $C_4$ alkyl).

Column 11, line 55 to column 12, line 13:

Examples of olefinically unsaturated monomers that may be polymerized include methyl methacrylate, ethyl methacrylate, propyl methacrylate (all isomers), butyl methacrylate (all isomers), and other alkyl methacrylates; corresponding acrylates; also functionalized methacrylates and acrylates including glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2=C(Hal)_2$ where each halogen is independently Cl or F; optionally substituted butadienes of the formula $CH_2=C(R_{15}) C(R_{15})=CH_2$ where $R_{15}$ is independently H, Cl to C10 alkyl, Cl, or F; sulphonic acids or derivatives thereof of formula $CH_2=CHSO_2OM$ wherein M is Na, K, Li, $N(R_{16})_4$ where each $R_{16}$ is independently H or [Cl or V10] *Cl to C10* alkyl, D is COZ, ON, $N(R_{16})2$ or $SO_2OZ$ and Z is H, Li, Na, K or $N(R_{16})_4$; acylamide or derivatives thereof of formula $CH_2=CHCON(R_{16})_2$ and methacrylamide or derivative thereof of formula $CH_2=C(CH_3)CON(R_{16})_2$. Mixtures of such monomers may be used.

AS A RESULT OF REEXAMINATION, IT HAS BEEN DETERMINED THAT:

Claim 5 is cancelled.

Claims 1–3, 6–12, 14, 16 and 17 are determined to be patentable as amended.

Claims 4, 13, 15 and 18, dependent on an amended claim, are determined to be patentable as amended.

New claims 19–108 are added and determined to be patentable.

1. A catalyst for addition polymerization of olefinically unsaturated monomers comprising:
   a) a first compound MY wherein M is a transition metal in a low valency state or a transition metal in a low valency state coordinated to at least one coordinating non-charged ligand; and Y is a monovalent, divalent or polyvalent counterion;
   b) an initiator compound comprising a homolytically cleavable bond with a halogen atom; and
   c) an organodiimine, wherein at least one of the nitrogens of the diimine is not part of an aromatic ring *and is selected from the group consisting of a 2-pyridine carbaldehyde imine and a 1,4-diaza-1,3-butadiene*.

2. A catalyst according to claim 1 wherein the organodiimine is selected from the group consisting of:
   a 1,4-diaza-1,3-butadiene

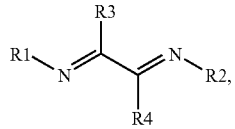

Formula 24 a 2-pyridine carbaldehyde imine

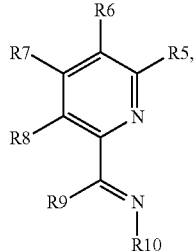

Formula 25

[an oxazolidone

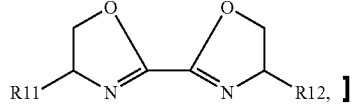

Formula 26 or a quinoline carbaldehyde

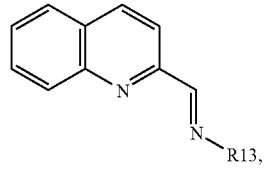

Formula 27 wherein $R_1$, $R_2$, $R_{10}$, [$R_{11}$, $R_{12}$,] and $R_{13}$ are independently selectable and may be selected from the group consisting of H, straight chain *alkyl*, branched chain [or] *alkyl*, cyclic saturated alkyl, hydroxyalkyl, carboxyalkyl, aryl, $CH_2Ar$, wherein Ar is aryl or substituted *aryl*, or a halogen;

$R_3$ to $R_9$ are independently selectable and may be selected from the group consisting of H, straight chain *alkyl*, branched chain [or] *alkyl*, cyclic alkyl, hydroxyalkyl, carboxyalkyl, aryl, $CH_2$ Ar, a halogen, [$OCH_{2n+1}$] $OC_nH_{2n+1}$, wherein n is an integer of 1 to 20, $NO_2$, CN, O=CR wherein R[=] *is an* alkyl, aryl, substituted aryl, benzyl [$PhCH_2$] or a substituted benzyl.

3. A catalyst according to claim 2 wherein $R_1$ to $R_{10}$ *and $R_{13}$* are selected from the group consisting of $C_1$ to $C_{20}$ alkyl, $C_1$ to $C_{20}$ hydroxyalkyl, $C_1$ to $C_{20}$ carboxyalkyl, n-propyl, isopropyl, n-butyl, sec-butyl, tert-butyl, cyclohexyl, 2-ethylhexyl, octyl, decyl and lauryl.

6. A catalyst according claim [1] *2* wherein M is [selected from the group consisting of] Cu(I)[Fe(II), Co(II), Ru(II), Ni(II), Sm(II), Ag(I) and Yb(II)].

7. A catalyst according claim [1] *6*, wherein Y is selected from the group consisiting of Cl, Br, *and* I[, $NO_3$, $PF_6$, $BF_4$, $SO_4$, and $CF_3$ $SO_3$, CN, SPh, ScN and SePh.].

8. A catalyst according to claim [1] *2*, wherein the initiator *compound* is selected from the group consisting of:

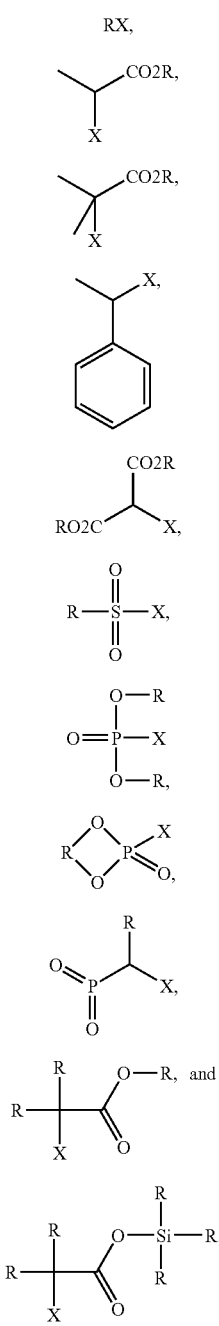

Formula 2
Formula 3
Formula 4
Formula 5
Formula 6
Formula 7
Formula 8
Formula 9
Formula 10
Formula 11
Formula 12 wherein R is independently selectable and is selected from the group consisting of straight chain alkyl, branched chain alkyl, cyclic alkyl, hydrogen, substituted alkyl, hydroxyalkyl, carboxyalkyl, aryl and substituted aryl and substituted benzyl, and wherein X[=] *is* a halide.

9. A catalyst according to claim 8, wherein the initiator *compound* is

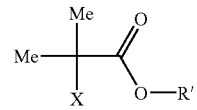

wherein:

X[=] *is* Br, I or Cl, [r]

R'[=] *is* —H,
—$(CH_2)_p$R'', wherein p is a whole number and R''[=] *is* H, OH, $NH_2$, $SO_3H$, COOH, halide, [COX] *O=CX*, where X is Br, I or Cl, or

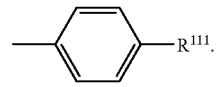

$R^{111}$[=] *is* —COOH, [—COX] *O=CX*, where X is Br, I, or Cl, [.] —OH, —$NH_2$ or —$SO_3H$.

10. A catalyst according to claim [9] *8* wherein b is 2-hydroxyethyl-2'bromopropionate.

11. A method for addition polymerization of one or more olefinically [saturated] *unsaturated* monomers comprising:
    addition polymerizing one or more olefinically [saturated] *unsaturated* monomers using the catalyst of claim [1] *2*.

12. The method according to claim 11, wherein the addition polymerization is conducted at a temperature between –20° C. [to] *and* 200° C.

14. The method according to claim 11, wherein the olefinically [saturated] *unsaturated* monomers are selected from methyl methacrylate, ethyl methacrylate, propyl methacrylate including all isomers thereof, butyl methacrylate including all isomers thereof, other alkyl methycrylates, corresponding acrylates, functionalized methacrylates and acrylates, fluoroalkyl (meth)acrylates, methacrylic acid, acrylic acid, fumaric acid, and esters thereof, itaconic acid and esters thereof, nucleic anhydride, styrene, α-methyl styrene, vinyl halides, acrylonitrile, methacrylonitrile, vinylidene halides of formula [$CH_2$—$C(Hal)_2$] $CH_2=C(Hal)_2$ wherein each halogen is independently Cl or F, optionally substituted butadiene of the formula $CH_2=C(R_{15})C(R_{15})=CH_2$ wherein $R_{15}$ is independently H, Cl to C10 alkyl, Cl or F, sulphonic acids or derivatives thereof of formula $CH_2=CHSO_2OM$ wherein M is NaS, K, Li, $N(R_{16})_4$, or —$(CH_2)_2$—D wherein each $R_{16}$ is independently H or [Cl or]*C1 to* C10 alkyl, D is $CO_2Z$, OH, $N(R_{16})_2$ or $SO_2OZ$ and Z is H[.], Li, Na, K or $N(R_{16})_4$, acrylamide or derivatives thereof of formula [$CH_2$—$C(CH_3)CON(R_{16})_2$] $CH_2=C(CH_3)CON(R_{16})_2$, and [wherein] mixtures thereof.

16. A method for producing a statistical copolymer, a block polymer, a telechelic polymer or a comb and graft copolymer of monomers, the method comprising:
    producing at least one of a statistical copolymer, a block polymer, a telechelic polymer and a comb and graft copolymer of monomers using the catalyst of claim [1] *2*.

17. A catalyst for addition polymerization of olefinically unsaturated monomers comprising:
a) a first component of formula $(ML_m)^{n+}A^{n-}$ wherein
M[=] is a transition metal of low valency state;
L[=] is an organodiimine where at least one of the nitrogens of the diimine is not part of an aromatic ring *and is selected from the group consisting of:*
*a 1,4-diaza-1,3-butadiene*

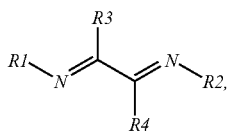

Formula 24

*a 2-pyridine carbaldehyde imine*

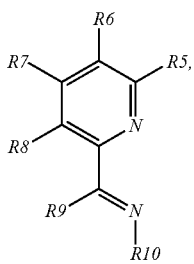

Formula 25

*an oxazolidone*

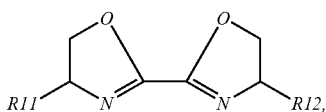

Formula 26

*and a quinoline carbaldehyde*

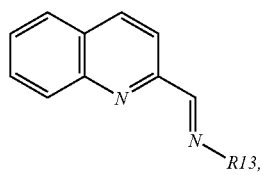

Formula 27 wherein $R_1$, $R_2$, $R_{10}$, $R_{11}$, $R_{12}$, and $R_{13}$ are independently selectable and may be selected from the group consisting of H, straight chain alkyl, branched chain alkyl, cyclic saturated alkyl, hydroxyalkyl, carboxyalkyl, aryl, $CH_2$ Ar, wherein Ar is aryl or substituted aryl, and a halogen;
$R_3$ to $R_9$ are independently selectable and may be selected from the group consisting of H, straight chain alkyl, branched chain alkyl, cyclic alkyl, hydroxyalkyl, carboxyalkyl, aryl, $CH_2$ Ar, a halogen, $OC_yH_{2y+1}$, wherein y is an integer of 1 to 20, $NO_2$, CN, O=CR wherein R is an alkyl, aryl, substituted aryl, benzyl or a substituted benzyl;
A[=] *is* an anion;
n[=] *is* an integer from 1 to 3;
m[=] *is* and integer from 1 to 2; and
b) an initiator compound comprising a homolytically cleavable bond with a halogen atom.

*19. A catalyst for addition polymerization of olefinically unsaturated monomers comprising:*
*a) a first compound MY wherein M is a transition metal in a low valency state or a transition metal in a low valency state coordinated to at least one coordinating non-charged ligand; and Y is a monovalent counterion;*
*b) an initiator compound comprising a homolytically cleavable bond with Cl, Br or I; and*
*c) an organodiimine that is a 1,4-diaza-1,3-butadiene:*

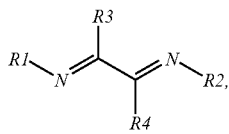

*wherein $R_1$ and $R_2$, are independently selected from the group consisting of H, straight chain alkyl, branched chain alkyl, cyclic saturated alkyl, aryl, $CH_2Ar$ wherein Ar is aryl, or a halogen;*
*$R_3$ and $R_4$ are independently selected from the group consisting of H, straight chain alkyl, branched chain alkyl, aryl, $CH_2Ar$, a halogen, $OC_nH_{2n+1}$, wherein n is an integer of 1 to 20, $NO_2$, CN, O=CR wherein R is an alkyl, benzyl, or a substituted benzyl.*
*20. A catalyst according to claim 19, wherein $R_1$ and $R_2$ are selected from the group consisting of $C_1$ to $C_{20}$ alkyl, n-propyl, isopropyl, n-butyl, sec-butyl, tert-butyl, cyclohexyl, octyl, decyl and lauryl; and $R_3$ and $R_4$ are hydrogen.*
*21. A catalyst according to claim 19, wherein the organodiimine comprises a chiral center.*
*22. A catalyst according to claim 19, wherein M is Cu(I).*
*23. A catalyst according claim 19, wherein M is selected from the group consisting of Fe(II), Co(II), Ru(II), Ni(II) and Ag(I).*
*24. A catalyst according to claim 22, wherein Y is selected from the group consisting of Cl, Br, and I.*
*25. A catalyst according to claim 19, wherein Y is selected from the group consisting of $CF_3SO_3$ and CN.*
*26. A catalyst according to claim 19, wherein the initiator compound is selected from the group consisting of:*

Formula 2

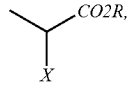

Formula 3

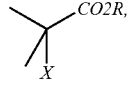

Formula 4

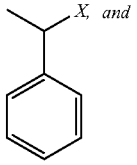

Formula 5

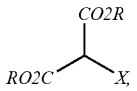

Formula 6

*wherein R is independently selectable and is selected from the group consisting of straight chain alkyl, branched* chain alkyl, cyclic alkyl, hydrogen, substituted alkyl, hydroxyalkyl, carboxyalkyl, aryl and substituted aryl and substituted benzyl, and wherein X is a Cl, Br or I.

27. A catalyst according to claim 19, wherein the initiator compound is selected from the group consisting of:

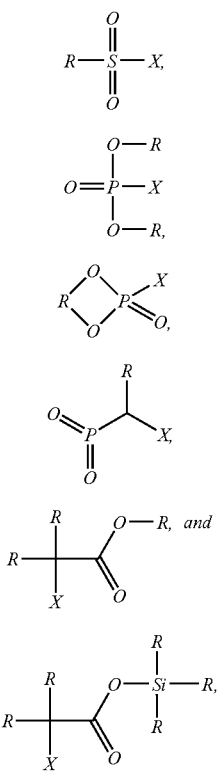

Formula 7

Formula 8

Formula 9

Formula 10

Formula 11

Formula 12 wherein R is independently selectable and is selected from the group consisting of straight chain alkyl, branched chain alkyl, cyclic alkyl, hydrogen, substituted alkyl, hydroxyalkyl, carboxyalkyl, aryl, substituted aryl and substituted benzyl, and wherein X is a halide.

28. A catalyst according to claim 24, wherein the initiator compound is

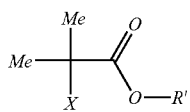

wherein:
X is Br, I or Cl,
R' is —H,
—(CH$_2$)$_p$ R", wherein p is a whole number and R" is H, OH, NH$_2$, SO$_3$H, COOH, halide, O=CX, where X is Br, I or Cl,
or

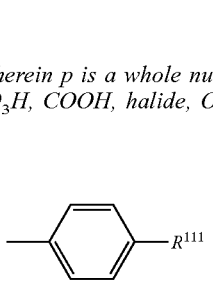

R$^{111}$ is —COOH, O=CX, where X is Br, I, or Cl, —OH, —NH$_2$ or —SO$_3$H.

29. A catalyst according to claim 19, wherein b is 2-hydroxyethyl-2'bromopropionate.

30. A catalyst according to claim 19, wherein the organodiimine is selected from the group consisting of dimethylaniline diazabutadiene, tert butyl diazabutadiene, and isopropyl diazabutadiene.

31. A catalyst according to claim 19, wherein the organodiimine is:

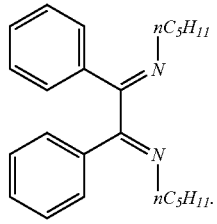

32. A method for addition polymerization of one or more olefinically unsaturated monomers comprising:
    addition polymerizing one or more olefinically unsaturated monomers using the catalyst of claim 19.

33. The method of claim 32, wherein the addition polymerization is conducted at a temperature between −20° C. and 200° C.

34. The method according to claim 32, wherein the addition polymerization is conducted at a temperature between 20° C. and 130° C.

35. The method according to claim 32, wherein the monomer is selected from methyl methacrylate, ethyl methacrylate, propyl methacrylate, butyl methacrylate, methyl acrylate, ethyl acrylate, propyl acrylate, butyl acrylate, methacrylonitrile, and acrylonitrile.

36. The method according to claim 32, wherein the polymerization is conducted in water, a protic solvent or a nonprotic solvent.

37. A method for producing a statistical copolymer, a block polymer, a telechelic polymer or a comb and graft copolymer of monomers, the method comprising:
    producing at least one of a statistical copolymer, a block polymer, a telechelic polymer and a comb and graft copolymer of monomers using the catalyst of claim 19.

38. A catalyst for addition polymerization of olefinically unsaturated monomers comprising:
    a) a first compound MY wherein M is a transition metal in a low valency state or a transition metal in a low valency state coordinated to at least one coordinating non-charged ligand; and Y is a monovalent counterion;
    b) an initiator compound comprising a homolytically cleavable bond with Cl, Br or I; and
    c) an organodiimine that is a 2-pyridine carbaldehyde imine;

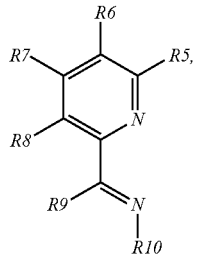

wherein R$_{10}$ is selected from the group consisting of H, straight chain alkyl, branched chain alkyl, cyclic saturated alkyl, aryl, CH$_2$Ar, wherein Ar is aryl, or a halogen;

$R_5$, $R_6$, $R_7$, $R_8$, and $R_9$ are independently selected from the group consisting of H, straight chain alkyl, branched chain alkyl, aryl, $CH_2$ Ar, a halogen, $OC_nH_{2n+1}$, wherein n is an integer of 1 to 20, $NO_2$, CN, O=CR wherein R is alkyl, benzyl or a substituted benzyl.

39. A catalyst according to claim 38, wherein $R_9$ is H.

40. A catalyst according to claim 39, wherein $R_{10}$ is selected from the group consisting of n-propyl, isopropyl, n-butyl, sec-butyl, tert-butyl, cyclohexyl, 2-ethylhexyl, octyl, decyl and lauryl.

41. A catalyst according to claim 39, wherein the organodiimine comprises a chiral center.

42. A catalyst according to claim 39, wherein the organodiimine is:

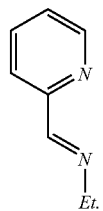

43. A catalyst according to claim 39, wherein the organodiimine is:

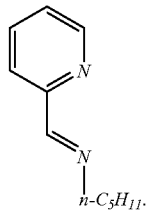

44. A catalyst according to claim 39, wherein the organodiimine is:

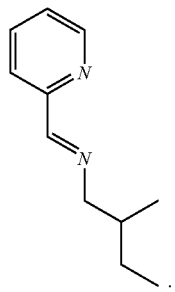

45. A catalyst according to claim 38, wherein the organodiimine is:

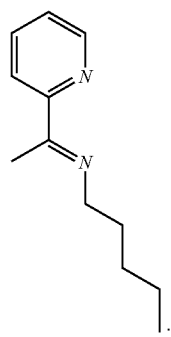

46. A catalyst according to claim 39, wherein the organodiimine is:

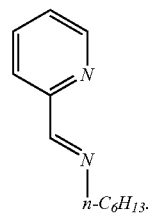

47. A catalyst according to claim 39, wherein the organodiimine is:

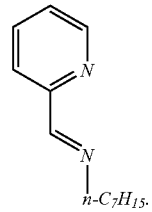

48. A catalyst according to claim 39, wherein the organodiimine is:

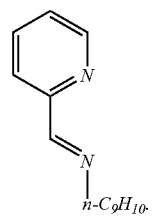

49. A catalyst according to claim 39, wherein the organodiimine is:

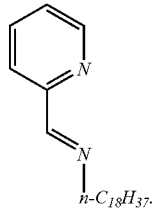

50. A catalyst according to claim 39, wherein the organodiimine is:

51. A catalyst according to claim 1, wherein the organodiimine is:

52. A catalyst according to claim 39, wherein the organodiimine is:

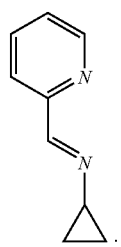

53. A catalyst according to claim 1, wherein the organodiimine is:

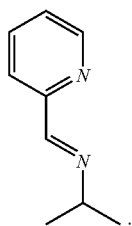

54. A catalyst according to claim 1, wherein the organodiimine is:

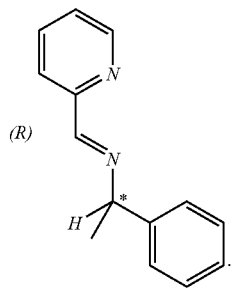

55. A catalyst according to claim 1, wherein the organodiimine is:

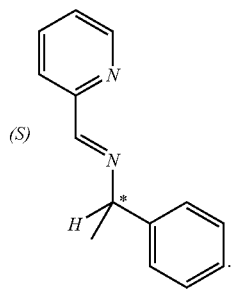

56. A catalyst according to claim 39, wherein the organodiimine is:

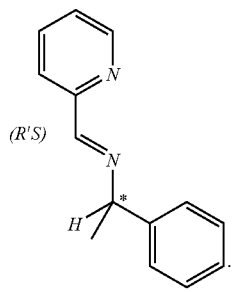

57. A catalyst according to claim 1, wherein the organodiimine is:

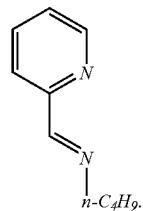

58. A catalyst according to claim 1, wherein the organodiimine is:

59. A catalyst according to claim 1, wherein the organodiimine is:

60. A catalyst according to claim 1, wherein the organodiimine is:

61. A catalyst according to claim 39, wherein M is Cu(I).

62. A catalyst according to claim 39, wherein M is selected from the group consisting of Fe(II), Co(II), Ru(II), Ni(II) and Ag(I).

63. A catalyst according to claim 61, wherein Y is selected from the group consisting of Cl, Br, and I.

64. A catalyst according to claim 39, wherein Y is selected from the group consisting of $CF_3SO_3$ and CN.

65. A catalyst according to claim 39, wherein the initiator compound is selected from the group consisting of:

RX, Formula 2

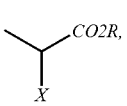
Formula 3

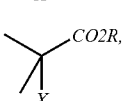
Formula 4

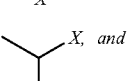
X, and Formula 5

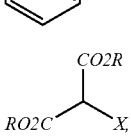
Formula 6 wherein R is independently selectable and is selected from the group consisting of straight chain alkyl, branched chain alkyl, cyclic alkyl, hydrogen, substituted alkyl, hydroxyalkyl, carboxyalkyl, aryl and substituted aryl and substituted benzyl, and wherein X is Cl, Br, or I.

66. A catalyst according to claim 39, wherein the initiator compound is selected from the group consisting of:

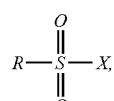
Formula 7

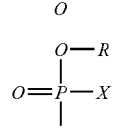
Formula 8

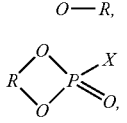
Formula 9

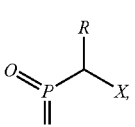
Formula 10

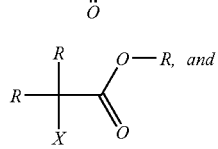
Formula 11

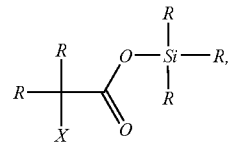
Formula 12 wherein R is independently selectable and is selected from the group consisting of straight chain alkyl, branched chain alkyl, cyclic alkyl, hydrogen, substituted alkyl, hydroxyalkyl, carboxyalkyl, aryl, substituted aryl and substituted benzyl, and wherein X is a halide.

67. A catalyst according to claim 39, wherein the initiator compound is

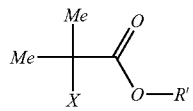

wherein:
X is Br, I or Cl,
R' is —H,
—$(CH_2)_p$ R", wherein p is a whole number and R" is H, OH, $NH_2$, $SO_3H$, COOH, halide, O=CX, where X is Br, I or Cl,
or

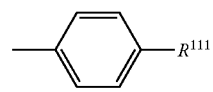

$R^{111}$ is —COOH, O=CX, where X is Br, I or Cl, —OH, —$NH_2$ or —$SO_3H$.

68. A catalyst according to claim 39, wherein (b) is 2-hydroxyethyl-2'bromopropionate.

69. A method for addition polymerization of one or more olefinically unsaturated monomers comprising:
addition polymerizing one or more olefinically unsaturated monomers using the catalyst of claim 38.

70. The method according to claim 69, wherein the addition polymerization is conducted at a temperature between −20° C. and 200° C.

71. The method according to claim 69, wherein the addition polymerization is conducted at a temperature between 20° C. and 130° C.

72. The method according to claim 69, wherein the monomer is selected from methyl methacrylate, ethyl methacrylate, propyl methacrylate, butyl methacrylate, methyl acrylate, ethyl acrylate, propyl acrylate, butyl acrylate, methacrylonitrile, and acrylonitrile.

73. The method according to claim 69, wherein the polymerization is conducted in water, a protic solvent or a nonprotic solvent.

74. A method for producing a statistical copolymer, a block polymer, a telechelic polymer or a comb and graft copolymer of monomers, the method comprising:
producing at least one of a statistical copolymer, a block polymer, a telechelic polymer and a comb and graft copolymer of monomers using the catalyst of claim 38.

75. A catalyst for addition polymerization of olefinically unsaturated monomers comprising:

a) a first compound MY wherein M is a transition metal in a low valency state or a transition metal in a low valency state coordinated to at least one coordinating non-charged ligand; and Y is monovalent, divalent or polyvalent counterion;

b) an initiator compound comprising a homolytically cleavable bond with Cl, Br or I; and c) an organodiimine oxazolidone;

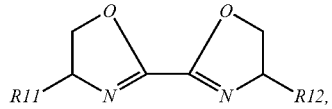

wherein $R_{11}$ and $R_{12}$ are independently selectable and may be selected from the group consisting of H, straight chain alkyl, branched chain alkyl or cyclic saturated alkyl, hydroxyalkyl, carboxyalkyl, aryl, $CH_2Ar$, wherein Ar is aryl, or a halogen.

76. A catalyst according to claim 75, wherein $R_{11}$ and $R_{12}$ are selected from the group consisting of $C_1$ to $C_{20}$ alkyl, $C_1$ to $C_{20}$ hydroxyalkyl, $C_1$ to $C_{20}$ carboxyalkyl, n-propyl, isopropyl, n-butyl, sec-butyl, tert-butyl, cyclohexyl, 2-ethylhexyl, octyl, decyl and lauryl.

77. A catalyst according to claim 75, wherein the organodiimine oxazolidone comprises a chiral center.

78. A catalyst according to claim 75, wherein the organodiimine oxazolidine is:

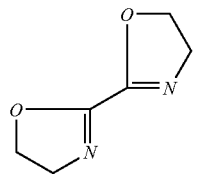

79. A catalyst according to claim 75, wherein the organodiimine oxazolidine is:

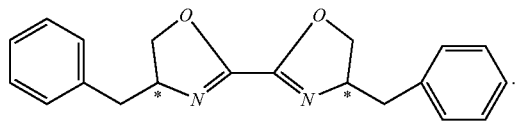

80. A catalyst according to claim 75, wherein M is selected from the group consisting of Cu(I), Fe(II), Co(II), Ru(II), Ni(II) and Ag(I).

81. A catalyst according to claim 75, wherein Y is selected from the group consisting of Cl, Br, I, $NO_3$, $PF_6$, $BF_4$, $SO_4$, $CF_3SO_3$, CN, SPh, ScN and SePh.

82. A catalyst according to claim 75, wherein the initiator compound is selected from the group consisting of:

RX,         Formula 2

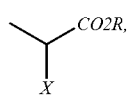    Formula 3

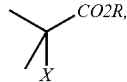    Formula 4

-continued

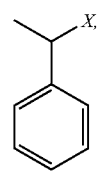    Formula 5

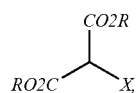    Formula 6

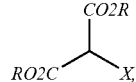    Formula 7

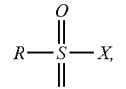    Formula 8

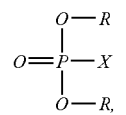    Formula 9

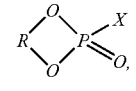    Formula 10

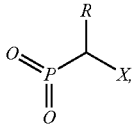    Formula 11

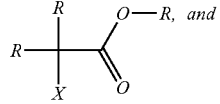    Formula 12

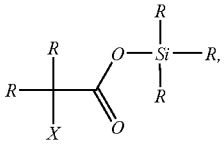

wherein R is independently selectable and is selected from the group consisting of straight chain alkyl, branched chain alkyl, cyclic alkyl, hydrogen, substituted alkyl, hydroxyalkyl, carboxyalkyl, aryl, substituted aryl and substituted benzyl, and wherein X is a halide.

83. A catalyst according to claim 75, wherein the initiator compound is

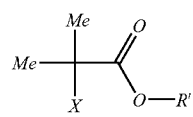

wherein:

X is Br, I or Cl,

R' is —H,

—$(CH_2)_p$ R'', wherein p is a whole number and R'' is H, OH, $NH_2$, $SO_3H$, COOH, halide, O=CX, where X is Br, I or Cl, or

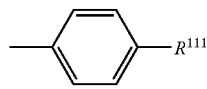

$R^{111}$ is —COOH, O═CX, where X is Br, I, or Cl, —OH, —NH$_2$ or —SO$_3$H.

84. A catalyst according to claim 75, wherein b is 2-hydroxyethyl-2'bromopropionate.

85. A method for addition polymerization of one or more olefinically unsaturated monomers comprising:

addition polymerizing one or more olefinically unsaturated monomers using the catalyst of claim 75.

86. The method according to claim 85, wherein the addition polymerization is conducted at a temperature between −20° C. and 200° C.

87. The method according to claim 85, wherein the addition polymerization is conducted at a temperature between 20° C. and 130° C.

88. The method according to claim 85, wherein the olefinically unsaturated monomers are selected from methyl methacrylate, ethyl methacrylate, propyl methacrylate including all isomers thereof, butyl methacrylate including all isomers thereof, other alkyl methacrylates, corresponding acrylates, functionalized methacrylates and acrylates, fluoroalkyl (meth)acrylates, methacrylic acid, acrylic acid, fumaric acid and esters thereof, itaconic acid and esters thereof, nucleic anhydride, styrene, α-methyl styrene, vinyl halides, acrylonitrile, methacrylonitrile, vinylidene halides of formula CH$_2$═C(Hal)$_2$ wherein each halogen is independently Cl or F, optionally substituted butadine of the formula CH$_2$═C(R$_{15}$)C(R$_{15}$)═CH$_2$ wherein R$_{15}$ is independently H, C$_1$ to C$_{10}$ alkyl, Cl or F, sulphonic acids or derivatives thereof of formula CH$_2$═CHSO$_2$OM wherein M is NaS, K, Li, N(R$_{16}$)$_4$, or —(CH$_2$)$_2$—D wherein each R$_{16}$ is independently H or C1 to C10 alkyl, D is CO$_2$Z, OH, N(R$_{16}$)$_2$ or SO$_2$OZ and Z is H, Li, Na, K or N(R$_{16}$)$_4$, acrylamide or derivatives thereof of formula CH$_2$═C(CH$_3$)CON(R$_{16}$)$_2$, and mixtures thereof.

89. The method according to claim 85, wherein the polymerization is conducted in water, a protic solvent or a nonprotic solvent.

90. A method for producing a statistical copolymer, a block polymer, a telechelic polymer or a comb and graft copolymer of monomers, the method comprising:

producing at least one of a statistical copolymer, a block polymer, a telechelic polymer and a comb and graft copolymer of monomers using the catalyst of claim 75.

91. A catalyst for addition polymerization of olefinically unsaturated monomers comprising:

a) a first compound MY wherein M is a transition metal in a low valency state or a transition metal in a low valency state coordinated to at least one coordinating non-charged ligand; and Y is a monovalent, divalent or polyvalent counterion;

b) an initiator compound comprising a homolytically cleavable bond with Cl, Br or I; and c) an organodiimine that is quinoline carbaldehyde:

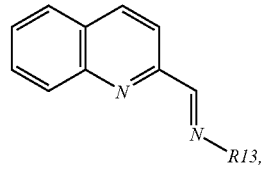

wherein R$_{13}$ is independently selectable and may be selected from the group consisting of H, straight chain alkyl, branched chain alkyl, cyclic saturated alkyl, hydroxyalkyl, carboxyalkyl, aryl, CH$_2$Ar, wherein Ar is aryl, or a halogen.

92. A catalyst according to claim 91, wherein R$_{13}$ is selected from the group consisting of C$_1$ to C$_{20}$ alkyl, C$_1$ to C$_{20}$ hydroxyalkyl, C$_1$ to C$_{20}$ carboxyalkyl, n-propyl, isopropyl, n-butyl, sec-butyl, tert-butyl, cyclohexyl, 2-ethylhexyl, octyl, decyl, and lauryl.

93. A catalyst according to claim 91, wherein the organodiimine comprises a chiral center.

94. A catalyst according to claim 91, wherein R$_{13}$ is pentyl.

95. A catalyst according to claim 91, wherein M is selected from the group consisting of Cu(I), Fe(II), Co(II), Ru(II), Ni(II) and Ag(I).

96. A catalyst according to claim 91, wherein Y is selected from the group consisting of Cl, Br, I, NO$_3$, PF$_6$, BF$_4$, SO$_4$, CF$_3$SO$_3$, CN, SPh, ScN and SePh.

97. A catalyst according to claim 91, wherein the initiator compound is selected from the group consisting of:

Formula 2

Formula 3

Formula 4

Formula 5

Formula 6

Formula 7

Formula 8

-continued

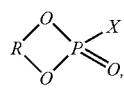

Formula 9

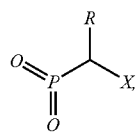

Formula 10

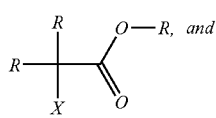

Formula 11

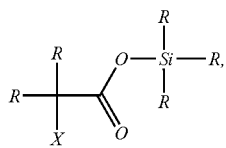

Formula 12 wherein R is independently selectable and is selected from the group consisting of straight chain alkyl, branched chain alkyl, cyclic alkyl, hydrogen, substituted alkyl, hydroxyalkyl, carboxyalkyl, aryl, substituted aryl and substituted benzyl, and wherein X is a halide.

98. A catalyst according to claim 91, wherein the initiator compound is

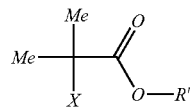

wherein:

X is Br, I or Cl,

R' is —H,

—$(CH_2)_p$ R", wherein p is a whole number and R" is H, OH, $NH_2$, $SO_3H$, COOH, halide, O═CX, where X is Br, I or Cl, or

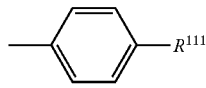

$R^{111}$ is —COOH, O═CX, where X is Br, I or Cl, —OH, —$NH_2$ or —$SO_3H$.

99. A catalyst according to claim 91, wherein b is 2-hydroxyethyl-2'bromopropionate.

100. A method for addition polymerization of one or more olefinically unsaturated monomers comprising:

addition polymerizing one or more olefinically unsaturated monomers using the catalyst of claim 91.

101. The method according to claim 100, wherein the addition polymerization is conducted at a temperature between −20° C. and 200° C.

102. The method according to claim 100, wherein the addition polymerization is conducted at a temperature between 20° C. and 130° C.

103. The method according to claim 100, wherein the olefinically unsaturated monomers are selected from methyl methacrylate, ethyl methacrylate, propyl methacrylate including all isomers thereof, butyl methacrylate including all isomers thereof, other alkyl methacrylates, corresponding acrylates, functionalized methacrylates and acrylates, fluoroalkyl (meth)acrylates, methacrylic acid, acrylic acid, fumaric acid and esters thereof, itaconic acid and esters thereof, nucleic anhydride, styrene, α-methyl styrene, vinyl halides, acrylonitrile, methacrylonitrile, vinylidene halides of formula $CH_2$═$C(Hal)_2$ wherein each halogen is independently Cl or F, optionally substituted butadine of the formula $CH_2$═$C(R_{15})C(R_{15})$═$CH_2$ wherein $R_{15}$ is independently H, $C_1$ to $C_{10}$ alkyl, Cl or F, sulphonic acids or derivatives thereof of formula $CH_2$═$CHSO_2OM$ wherein M is NaS, K, Li, $N(R_{16})_4$, or —$(CH_2)_2$—D wherein each $R_{16}$ is independently H or C1 to C10 alkyl, D is $CO_2Z$, OH, $N(R_{16})_2$ or $SO_2OZ$ and Z is H, Li, Na, K or $N(R_{16})_4$, acrylamide or derivatives thereof of formula $CH_2$—$C(CH_3)CON(R_{16})_2$, and mixtures thereof.

104. The method according to claim 100, wherein the polymerization is conducted in water, a protic solvent or a nonprotic solvent.

105. A method for producing a statistical copolymer, a block polymer, a telechelic polymer or a comb and graft copolymer of monomers, the method comprising:

producing at least one of a statistical copolymer, a block polymer, a telechelic polymer and a comb and graft copolymer of monomers using the catalyst of claim 91.

106. A catalyst for addition polymerization of olefinically unsaturated monomers comprising:

a) a first component of formula $(ML_m)^{n+}A^{n-}$ wherein

M is a transition metal of low valency state;

L is a 1,4-diaza-1,3-butadiene or a 2-pyridine carbaldehyde imine;

A is an anion;

n is 1;

m is 2; and b) an initiator compound comprising a homolytically cleavable bond with a halogen atom.

107. A catalyst according to claim 106, wherein A is selected from the group consisting of Cl, Br, I, $NO_3$, and $CuX_2$, wherein X is a halogen.

108. A catalyst according to claim 1 wherein the organodiimine is selected from the group consisting of:

a 1,4-diaza-1,3-butadiene

Formula 24

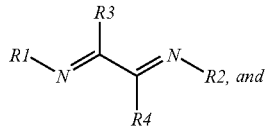

a 2-pyridine carbaldehyde imine

Formula 25

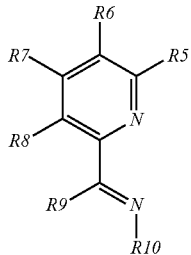

wherein $R_1$, $R_2$, and $R_{10}$ are independently selectable and may be selected from the group consisting of H, straight chain alkyl, branched chain alkyl, cyclic saturated alkyl, hydroxyalkyl, carboxyalkyl, aryl, $CH_2$ Ar, wherein Ar is aryl or substituted, or a halogen;

$R_3$ to $R_9$ are independently selectable and may be selected from the group consiting of H, straight chain alkyl, branched chain alkyl, cyclic alkyl, hydroxyalkyl, carboxyalkyl, aryl, $CH_2$ Ar, a halogen, $OC_nH_{2n+1}$ wherein n is an integer of 1 to 20, $NO_2$, CN, O=CR wherein R is alkyl, aryl, substituted aryl, benzyl, or a substituted benzyl; and wherein one or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups are selected from the group consisting of cycloalkyl, cycloalkenyl, polycycloalkyl, and polycycloalkenyl, containing 5 to 8 carbon atoms or wherein one or more adjacent $R_1$ and $R_3$, $R_3$ and $R_4$, $R_8$ and $R_9$, $R_8$ and $R_7$, $R_7$ and $R_6$, $R_6$ and $R_5$ groups are selected from the group consisting of cycloalkyl, cycloalkenyl, polycycloalkyl, polycycloalkenyl, and cyclicaryl containing 5 to 8 carbon atoms.

\* \* \* \* \*